US012647438B2

(12) United States Patent
Torisaki et al.

(10) Patent No.: US 12,647,438 B2
(45) Date of Patent: Jun. 2, 2026

(54) INFORMATION PROCESSING DEVICE AND METHOD OF CONTROLLING INFORMATION PROCESSING DEVICE

(71) Applicant: Panasonic Intellectual Property Management Co., Ltd., Osaka (JP)

(72) Inventors: Yuishi Torisaki, Osaka (JP); Takayoshi Ito, Osaka (JP); Kaoru Yokota, Hyogo (JP); Akihito Takeuchi, Osaka (JP); Toshihisa Nakano, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 312 days.

(21) Appl. No.: 18/134,183

(22) Filed: Apr. 13, 2023

(65) Prior Publication Data

US 2023/0247037 A1 Aug. 3, 2023

Related U.S. Application Data

(63) Continuation of application No. PCT/JP2021/037477, filed on Oct. 8, 2021.

(30) Foreign Application Priority Data

Oct. 29, 2020 (JP) ................................. 2020-181935

(51) Int. Cl.
*H04L 29/06* (2006.01)
*H04L 9/40* (2022.01)
(52) U.S. Cl.
CPC ................................. *H04L 63/1425* (2013.01)
(58) Field of Classification Search
CPC ................................................. H04L 63/1425
(Continued)

(56) References Cited

U.S. PATENT DOCUMENTS

| | | | | |
|---|---|---|---|---|
| 8,935,750 | B2 * | 1/2015 | Golovanov | G06F 21/56 |
| | | | | 705/52 |
| 11,777,987 | B2 * | 10/2023 | Tupsamudre | H04L 63/1408 |
| | | | | 726/23 |

(Continued)

FOREIGN PATENT DOCUMENTS

| | | |
|---|---|---|
| JP | 2012-221031 | 11/2012 |
| JP | 2018-032254 | 3/2018 |

(Continued)

OTHER PUBLICATIONS

Buczak, "A Survey of Data Mining and Machine Learning Methods for Cyber Security Intrusion Detection", 2016, IEEE, vol. 18, pp. 1153-1174 (Year: 2016).*

(Continued)

*Primary Examiner* — Taghi T Arani
*Assistant Examiner* — Gregory A Lane
(74) *Attorney, Agent, or Firm* — Greenblum & Bernstein, P.L.C.

(57) ABSTRACT

A log management module includes: an anomaly detection information receiver that receives anomaly detection information; a detection history information storage that stores detection history information; an attack route information storage that stores attack route information indicating a candidate for an attack route in the CAN bus; an attack route estimator that estimates an attack route including the specific device, based on the attack route information; and a collection target determiner that, upon receipt of the anomaly detection information by the anomaly detection information receiver, determines, as collection targets whose log information for analysis which is for analyzing presence or absence of an undetected anomaly in the CAN bus is to be collected, one or more candidate devices which have been narrowed down from the devices, are present on the attack (Continued)

route estimated by the attack route estimator, and have no history of anomaly detection.

13 Claims, 19 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2006/0030984 | A1* | 2/2006 | Kamiya | G08G 1/166 |
| | | | | 701/31.4 |
| 2011/0160978 | A1* | 6/2011 | Yuzawa | B60W 30/146 |
| | | | | 701/93 |
| 2013/0086636 | A1* | 4/2013 | Golovanov | G06F 21/56 |
| | | | | 726/3 |
| 2015/0191135 | A1 | 7/2015 | Ben Noon et al. | |
| 2015/0191136 | A1 | 7/2015 | Ben Noon et al. | |
| 2015/0191151 | A1 | 7/2015 | Ben Noon et al. | |
| 2015/0195297 | A1 | 7/2015 | Ben Noon et al. | |
| 2016/0373473 | A1* | 12/2016 | Truong | H04W 76/50 |
| 2017/0099309 | A1* | 4/2017 | Di Pietro | H04L 63/1425 |
| 2019/0182275 | A1 | 6/2019 | Ando et al. | |
| 2019/0217869 | A1* | 7/2019 | Takeuchi | G06F 11/3013 |
| 2020/0296015 | A1 | 9/2020 | Imamoto | |
| 2020/0336495 | A1 | 10/2020 | Tada | |
| 2020/0382528 | A1* | 12/2020 | Kim | H04L 63/1466 |
| 2021/0136720 | A1* | 5/2021 | Geraghty | H04W 4/021 |
| 2021/0409330 | A1* | 12/2021 | Bolten | H04L 47/76 |

FOREIGN PATENT DOCUMENTS

| | | |
|---|---|---|
| JP | 6382724 | 8/2018 |
| JP | 2020-150430 | 9/2020 |
| WO | 2019/093098 | 5/2019 |

OTHER PUBLICATIONS

Arshad, "SAMADroid: A Novel 3-level Hybrid Malware Detection Model for Android Operating System", 2017, IEEE, pp. 4321-4336 (Year: 2017).*

Office Action from Japan Patent Office (JPO) in Japanese Patent Appl. No. 2022-558973, dated Feb. 13, 2024, together with an English language translation.

International Search Report (ISR) from International Searching Authority (Japan Patent Office) in International Pat. Appl. No. PCT/JP2021/037477, dated Dec. 21, 2021, together with an English language translation.

\* cited by examiner

| Anomaly detection information | Log information for analysis | Distance information |
|---|---|---|
| Anomaly detection information A | NIDS log 1 | 1 |
| | CGW log 1 | 2 |
| | TCU log 1 | 3 |
| | IVI log 1 | 3 |

| Anomaly detection information | Log information for analysis | Priority level |
|---|---|---|
| Anomaly detection information A | NIDS log 1 | 1 |
| | CGW log 1 | 1 |
| | TCU log 1 | 2 |
| | IVI log 1 | 2 |

Figure 12:
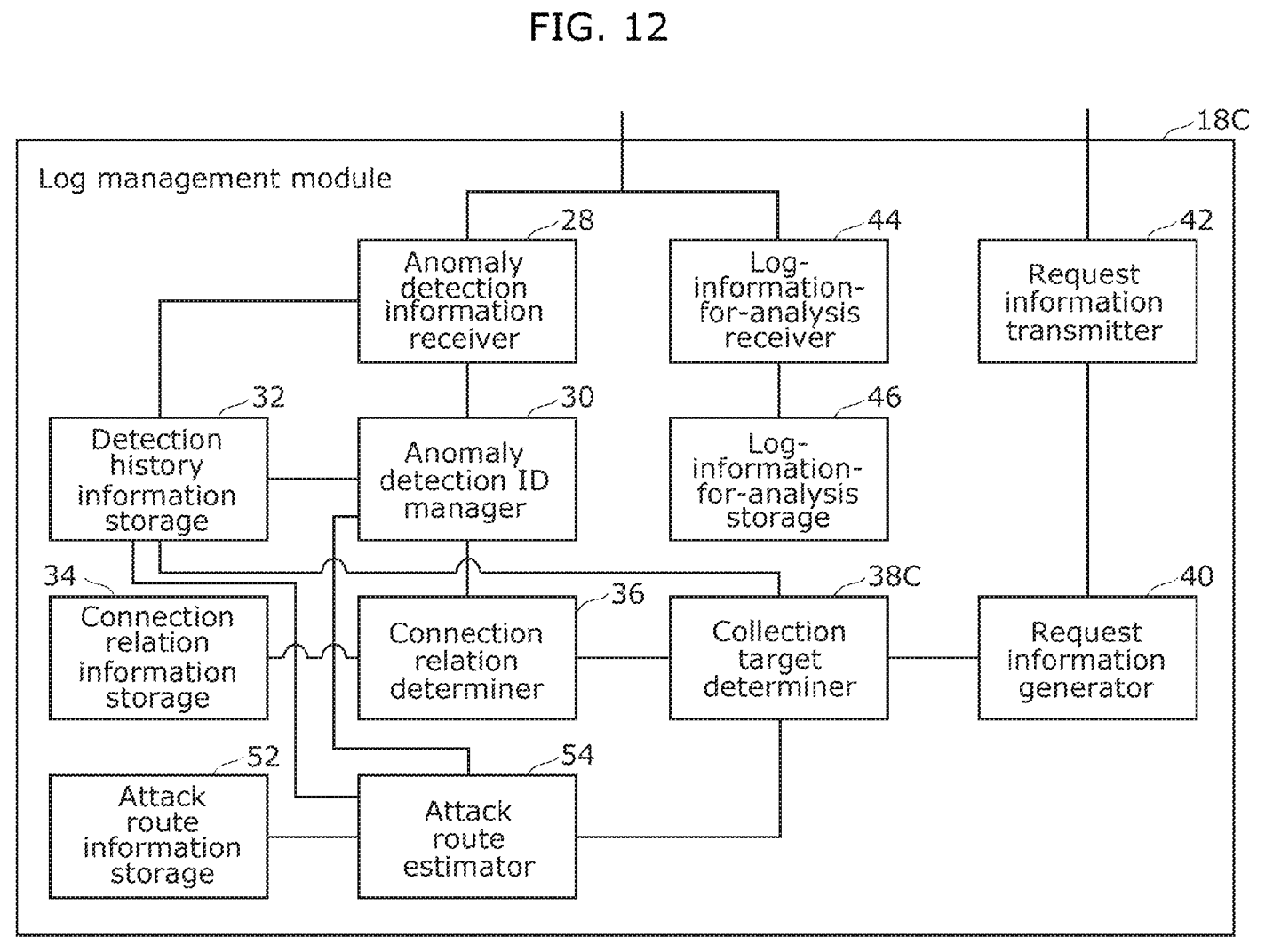

Log management module

Request information transmitter 42

Request information generator 40

Log-information-for-analysis receiver 44

Log-information-for-analysis storage 46

Collection target determiner 38C

Anomaly detection information receiver 28

Anomaly detection ID manager 30

Connection relation determiner 36

Attack route estimator 54

Detection history information storage 32

Connection relation information storage 34

Attack route information storage 52

INFORMATION PROCESSING DEVICE AND METHOD OF CONTROLLING INFORMATION PROCESSING DEVICE

CROSS REFERENCE TO RELATED APPLICATIONS

This is a continuation application of PCT International Application No. PCT/JP2021/037477 filed on Oct. 8, 2021, designating the United States of America, which is based on and claims priority of Japanese Patent Application No. 2020-181935 filed on Oct. 29, 2020.

FIELD

The present disclosure relates to an information processing device and a method of controlling the information processing device.

BACKGROUND

Patent Literature (PTL) 1 discloses a system including a Cyber-Watchman disposed inside each of a plurality of vehicles and a Cyber-Hub disposed outside each vehicle. The Cyber-Watchman is connected to an in-vehicle network included in the vehicle, and obtains traffic data on the in-vehicle network. The Cyber-Hub receives the traffic data obtained by the Cyber-Watchman, from the Cyber-Watchman via an external network (e.g., the Internet). In this way, the Cyber-Hub collects traffic data from each of the plurality of vehicles, thereby monitoring the presence or absence of anomaly in each vehicle.

CITATION LIST

Patent Literature

PTL 1: Japanese Patent No. 6382724

SUMMARY

The conventional system described above can be improved upon.

In view of this, the present disclosure provides an information processing device and a method of controlling the information processing device which are capable of improving upon the above related art.

An information processing device according to one aspect of the present disclosure is an information processing device which is connected to a mobility network included in a mobility, and includes: an anomaly detection information receiver that receives anomaly detection information from a specific device among a plurality of devices connected to the mobility network, the anomaly detection information indicating that an anomaly has been detected in the specific device; a detection history information storage that stores detection history information indicating a history of anomaly detection in each of the plurality of devices; an attack route information storage that stores attack route information indicating a candidate for an attack route in the mobility network; an attack route estimator that estimates an attack route including the specific device, based on the attack route information; a collection target determiner that, upon receipt of the anomaly detection information by the anomaly detection information receiver, determines, as collection targets whose log information for analysis is to be collected, one or more candidate devices narrowed down from the plurality of devices, based on the detection history information, the log information for analysis being for analyzing presence or absence of an undetected anomaly in the mobility network, the one or more candidate devices being present on the attack route estimated by the attack route estimator and having no history of anomaly detection; a request information transmitter that transmits request information to the one or more candidate devices determined by the collection target determiner, the request information being for requesting transmission of the log information for analysis; and a log-information-for-analysis receiver that receives the log information for analysis transmitted from the one or more candidate devices in response to the request information.

Note that these general and specific aspects may be implemented using a system, a method, an integrated circuit, a computer program, or a computer-readable recording medium such as a compact disc read-only memory (CD-ROM), or any combination of systems, methods, integrated circuits, computer programs, or recording media.

The information processing device, etc. according to one aspect of the present disclosure are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 2 is a block diagram illustrating a functional configuration of a log management module according to Embodiment 1.

FIG. 7 is a diagram illustrating an example of a management table according to Variation 1 of Embodiment 1.

FIG. 10 is a diagram illustrating an example of a management table according to Variation 2 of Embodiment 1.

FIG. 12 is a block diagram illustrating a functional configuration of a log management module according to Embodiment 2.

Figure 1:
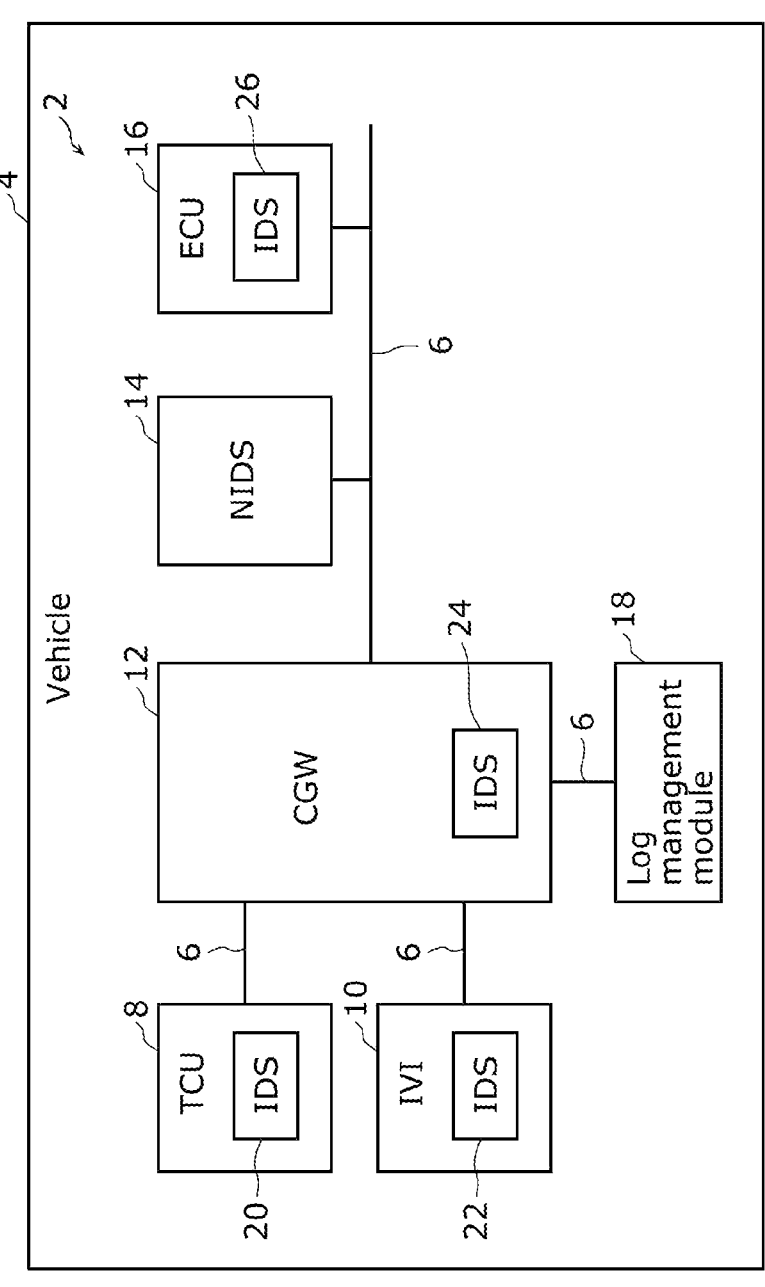
FIG. 1 is a block diagram illustrating the outline of a communication system according to Embodiment 1.

DESCRIPTION OF EMBODIMENTS (Underlying Knowledge Forming Basis of the Present Disclosure)

In relation to the system disclosed in the Background section, the inventors have found the problem described below.

For example, even when an anomaly is detected in a specific vehicle among a plurality of vehicles, the Cyber-Hub collects traffic data from all of the plurality of vehicles. As a result, the Cyber-Hub collects not only traffic data necessary for analyzing the anomaly detected in the specific vehicle, but also traffic data that is not necessary for analyzing such anomaly, which may cause the remaining storage capacity of the Cyber-Hub to become tight.

In order to solve such problems, an information processing device according to one aspect of the present disclosure is an information processing device which is connected to a mobility network included in a mobility, and includes: an anomaly detection information receiver that receives anomaly detection information from a specific device among a plurality of devices connected to the mobility network, the anomaly detection information indicating that an anomaly has been detected in the specific device; a detection history information storage that stores detection history information indicating a history of anomaly detection in each of the plurality of devices; an attack route information storage that stores attack route information indicating a candidate for an attack route in the mobility network; an attack route estimator that estimates an attack route including the specific device, based on the attack route information; a collection target determiner that, upon receipt of the anomaly detection information by the anomaly detection information receiver, determines, as collection targets whose log information for analysis is to be collected, one or more candidate devices narrowed down from the plurality of devices based on the detection history information, the log information for analysis being for analyzing presence or absence of an undetected anomaly in the mobility network, the one or more candidate devices being present on the attack route estimated by the attack route estimator and having no history of anomaly detection; a request information transmitter that transmits request information to the one or more candidate devices determined by the collection target determiner, the request information being for requesting transmission of the log information for analysis; and a log-information-for-analysis receiver that receives the log information for analysis transmitted from the one or more candidate devices in response to the request information.

According to the above-described aspect, the collection target determiner, upon receipt of the anomaly detection information by the anomaly detection information receiver, based on the detection history information, determines as collection targets whose log information for analysis is to be collected, one or more candidate devices which are narrowed down from the plurality of devices and present on the attack route estimated by the attack route estimator and having no history of anomaly detection. A candidate device which is not present on the attack route estimated by the attack route estimator is considered to be less likely to have a new unknown attack. For that reason, by excluding the candidate device which is not present on the estimated attack route from the collection targets whose log information for analysis is to be collected, it is possible to avoid wastefully collecting log information for analysis and collect log information for analysis appropriately.

In addition, an information processing device according to one aspect of the present disclosure is an information processing device which is connected to a mobility network included in a mobility, and includes: an anomaly detection information receiver that receives anomaly detection information from a specific device among a plurality of devices connected to the mobility network, the anomaly detection information indicating that an anomaly has been detected in the specific device; a connection relation information storage that stores connection relation information indicating interconnection relation between the plurality of devices; a detection history information storage that stores detection history information indicating a history of anomaly detection in each of the plurality of devices; a collection target determiner that, upon receipt of the anomaly detection information by the anomaly detection information receiver, determines, as collection targets whose log information for analysis is to be collected, one or more candidate devices narrowed down from the plurality of devices based on the connection relation information and the detection history information, the log information for analysis being for analyzing presence or absence of an undetected anomaly in the mobility network, the one or more candidate devices being in a predetermined connection relation with the specific device and having no history of anomaly detection; a request information transmitter that transmits request information to the one or more candidate devices determined by the collection target determiner, the request information being for requesting transmission of the log information for analysis; and a log-information-for-analysis receiver that receives the log information for analysis transmitted from the one or more candidate devices in response to the request information.

According to the above-described aspect, the collection target determiner determines, as collection targets whose log information for analysis is to be collected, one or more candidate devices which are in a predetermined connection relation with the specific device and have no history of anomaly detection, based on the connection relation information and the detection history information. A candidate device having a history of anomaly detection is considered to be less likely to have a new unknown attack. For that reason, it is possible to avoid wastefully collecting log information for analysis and collect log information for analysis appropriately, by excluding, even when a candidate device is in a predetermined connection relation with the specific device, the candidate device having a history of anomaly detection from the collection targets whose log information for analysis is to be collected.

In addition, an information processing device according to one aspect of the present disclosure is an information processing device which is connected to a mobility network included in a mobility, and includes: an anomaly detection information receiver that receives anomaly detection information from a specific device among a plurality of devices connected to the mobility network, the anomaly detection information indicating that an anomaly has been detected in the specific device; a connection relation information storage that stores connection relation information indicating interconnection relation between the plurality of devices; a connection relation determiner that determines a logical distance from the specific device; a log information storage that stores log information; a status determiner that determines any one of: a remaining storage capacity of the log information storage; a communication capacity in the mobility network; a movement status of the mobility; or a functional operation status of the mobility; a collection target determiner that, upon receipt of the anomaly detection information by the anomaly detection information receiver, determines based on a result of the determination by the status determiner: whether to narrow down collection targets whose log information for analysis is to be collected; and a target number of collection targets to be narrowed down to, and when the collection targets are to be narrowed down, determines the collection targets by not designating, as the collection targets, devices among the plurality of devices in descending order of the logical distance from the specific device obtained from the connection relation information and a result of the determination by the connection relation determiner, until a total number of remaining collection targets reaches the target number of collection targets; a request information transmitter that transmits request information to one or more candidate devices determined as the collection targets by the collection target determiner, the request information being for requesting transmission of the log information for analysis; and a log-information-for-analysis receiver that receives the log information for analysis transmitted from the one or more candidate devices in response to the request information.

According to the above-described aspect, it is possible to appropriately narrow down one or more candidate devices from the plurality of devices connected to the mobility network, according to any one of the remaining storage capacity of the log information storage, the communication capacity in the mobility network, the movement status of the mobility, or the functional operation status of the mobility. With this, it is possible to avoid wastefully collecting log information for analysis and collect log information for analysis appropriately.

For example, the status determiner may be configured to determine the remaining storage capacity of the log information storage, and the collection target determiner may be configured to not narrow down the collection targets when the remaining storage capacity of the log information storage is sufficient, and narrow down the collection targets when the remaining storage capacity of the log information storage is not sufficient.

According to the above-described aspect, it is possible to appropriately narrow down one or more candidate devices from the plurality of devices connected to the mobility network, according to the remaining storage capacity of the log information storage.

For example, the status determiner may be configured to determine the communication capacity in the mobility network, and the collection target determiner may be configured to not narrow down the collection targets when the communication capacity in the mobility network is sufficient, and narrow down the collection targets when the communication capacity in the mobility network is not sufficient.

According to the above-described aspect, it is possible to appropriately narrow down one or more candidate devices from the plurality of devices connected to the mobility network, according to the communication capacity in the mobility network.

For example, the status determiner may be configured to determine the movement status of the mobility, and the collection target determiner may be configured to not narrow down the collection targets when the mobility is stopped, and narrow down the collection targets when the mobility is in motion.

According to the above-described aspect, it is possible to appropriately narrow down one or more candidate devices from the plurality of devices connected to the mobility network, according to the movement status of the mobility.

For example, the status determiner may be configured to determine the functional operation status of the mobility, and the collection target determiner may be configured to not narrow down the collection targets when the mobility is driving automatically, and narrow down the collection targets when the mobility is being driven manually.

According to the above-described aspect, it is possible to appropriately narrow down one or more candidate devices from the plurality of devices connected to the mobility network, according to the functional operation status of the mobility.

For example, the information processing device may further include a log-information-for-analysis storage that stores the log information for analysis received by the log-information-for-analysis receiver, and the log-information-for-analysis receiver may be configured to delete the log information for analysis stored in the log-information-for-analysis storage in ascending order of effectiveness related to a degree of effectiveness of the log information for analysis, based on association information indicating association between the log information for analysis stored in the log-information-for-analysis storage and the effectiveness.

According to the above-described aspect, it is possible to accumulate highly useful log information for analysis in the log-information-for-analysis storage, and it is also possible to prevent the remaining storage capacity of the log-information-for-analysis storage from becoming tight.

For example, the effectiveness may be determined based on a logical distance between the specific device and a source of the log information for analysis.

According to the above-described aspect, it is possible to determine the effectiveness based on the logical distance between the specific device and the source of the log information for analysis.

For example, the effectiveness may be determined based on a position of a source of the log information for analysis relative to the specific device.

According to the above-described aspect, it is possible to determine the effectiveness based on the position of the source of the log information for analysis relative to the specific device.

For example, the information processing device may further include an anomaly notification transmitter that transmits an anomaly notification outside when the log information for analysis is not received by the log-information-for-analysis receiver within a predetermined period of time after the request information has been transmitted by the request information transmitter.

According to the above-described aspect, when the log information for analysis cannot be received, it is not possible to analyze the presence or absence of an undetected anomaly in the mobility network. For that reason, the failure to receive the log information for analysis itself is considered an anomalous event, and by transmitting an anomaly notification to the outside, it is possible to promptly take appropriate measures for such an anomalous event.

A method of controlling an information processing device according to one aspect of the present disclosure is a method of controlling an information processing device connected to a mobility network included in a mobility, and includes: (a) receiving anomaly detection information from a specific device among a plurality of devices connected to the mobility network, the anomaly detection information indicating that an anomaly has been detected in the specific device; (b) estimating an attack route including the specific device, based on attack route information indicating a candidate for the attack route in the mobility network; (c) upon receipt of the anomaly detection information in (a), determining, as collection targets whose log information for analysis is to be collected, one or more candidate devices narrowed down from the plurality of devices based on detection history information, the log information for analysis being for analyzing presence or absence of an undetected anomaly in the mobility network, the one or more candidate devices being present on the attack route estimated in (b) and having no history of anomaly detection, the detection history information indicating a history of anomaly detection in each of the plurality of devices; (d) transmitting request information to the one or more candidate devices determined in (c), the request information being for requesting transmission of the log information for analysis; and (e) receiving the log information for analysis transmitted from the one or more candidate devices in response to the request information.

According to the above-described aspect, based on detection history information, one or more candidate devices which have been narrowed down from the plurality of devices, are present on the estimated attack route, and have no history of anomaly detection are determined as collection targets whose log information for analysis is to be collected. A candidate device which is not present on the estimated attack route is considered to be less likely to have a new unknown attack. For that reason, by excluding the candidate device which is not present on the estimated attack route from the collection targets whose log information for analysis is to be collected, it is possible to avoid wastefully collecting log information for analysis and collect log information for analysis appropriately.

In addition, a method of controlling an information processing device according to one aspect of the present disclosure is a method of controlling an information processing device connected to a mobility network included in a mobility, and includes: (a) receiving anomaly detection information from a specific device among a plurality of devices connected to the mobility network, the anomaly detection information indicating that an anomaly has been detected in the specific device; (b) upon receipt of the anomaly detection information in (a), determining, as collection targets whose log information for analysis is to be collected, one or more candidate devices narrowed down from the plurality of devices based on connection relation information and detection history information, the log information for analysis being for analyzing presence or absence of an undetected anomaly in the mobility network, the one or more candidate devices being in a predetermined connection relation with the specific device and having no history of anomaly detection, the connection relation information indicating interconnection relation between the plurality of devices, the detection history information indicating a history of anomaly detection in each of the plurality of devices; (c) transmitting request information to the one or more candidate devices determined in (b), the request information being for requesting transmission of the log information for analysis; and (d) receiving the log information for analysis transmitted from the one or more candidate devices in response to the request information.

According to the above-described aspect, one or more candidate devices which are in a predetermined connection relation with the specific device and have no history of anomaly detection are determined based on the connection relation information and the detection history information, as collection targets whose log information for analysis is to be collected. A candidate device having a history of anomaly detection is considered to be less likely to have a new unknown attack. For that reason, it is possible to avoid wastefully collecting log information for analysis and collect log information for analysis appropriately, by excluding, even when a candidate device is in a predetermined connection relation with the specific device, the candidate device having a history of anomaly detection from the collection targets whose log information for analysis is to be collected.

In addition, a method of controlling an information processing device according to one aspect of the present disclosure is a method of controlling an information processing device connected to a mobility network included in a mobility, and includes: (a) receiving anomaly detection information from a specific device among a plurality of devices connected to the mobility network, the anomaly detection information indicating that an anomaly has been detected in the specific device; (b) determining a logical distance from the specific device; (c) determining any one of: a remaining storage capacity of log information storage that stores log information; a communication capacity in the mobility network; a movement status of the mobility; or a functional operation status of the mobility; (d) upon receipt of the anomaly detection information in (a), determining based on a result of the determining in (c): whether to narrow down collection targets whose log information for analysis is to be collected; and a target number of collection targets to be narrowed down to, and when the collection targets are to be narrowed down, determining the collection targets by not designating, as the collection targets, devices among the plurality of devices in descending order of the logical distance from the specific device obtained from connection relation information indicating interconnection relation between the plurality of devices and a result of the determining in (b), until a total number of remaining collection targets reaches the target number of collection targets; (e) transmitting request information to one or more candidate devices determined as the collection targets in (d), the request information being for requesting transmission of the log information for analysis; and (f) receiving the log information for analysis transmitted from the one or more candidate devices in response to the request information.

According to the above-described aspect, it is possible to appropriately narrow down one or more candidate devices from the plurality of devices connected to the mobility network, according to any one of the remaining storage capacity of the log information storage, the communication capacity in the mobility network, the movement status of the mobility, or the functional operation status of the mobility.

With this, it is possible to avoid wastefully collecting log information for analysis and collect log information for analysis appropriately.

It should be noted that these generic and specific aspects may be implemented using a system, a method, an integrated circuit, a computer program, or a computer-readable recording medium such as a CD-ROM, and may also be implemented by any combination of systems, methods, integrated circuits, computer programs, and recording media.

Hereinafter, embodiments are specifically described with reference to the drawings.

Each of the embodiments described below shows a general or specific example. The numerical values, shapes, materials, structural components, the arrangement and connection of the structural components, steps, the processing order of the steps, etc. presented in the following embodiments are mere examples, and therefore do not limit the present disclosure. Therefore, among the structural components in the following embodiments, structural elements not recited in any one of the independent claims are described as arbitrary structural elements.

Embodiment 1

1-1. Outline of Communication System

First, an outline of communication system 2 according to Embodiment 1 will be described with reference to FIG. 1. FIG. 1 is a block diagram illustrating the outline of communication system 2 according to Embodiment 1.

Communication system 2 according to Embodiment 1 is applied to an automatic driving system, for example, included in vehicle 4 such as an automobile, for automatically performing driving operation of vehicle 4. As illustrated in FIG. 1, communication system 2 includes a controller area network (CAN) bus 6, telematics control unit (TCU) 8, in-vehicle infotainment (IVI) 10, central gateway (CGW) 12, network-based intrusion detection system (NIDS) 14, electronic control unit (ECU) 16, and log management module 18.

It should be noted that vehicle 4 is an example of a mobility, and CAN bus 6 is an example of a mobility network. The mobility network which connects the devices is not limited to CAN bus 6 and may comprise, for example, Ethernet (registered trademark), FlexRay (registered trademark), or a mixture thereof. Each of TCU 8, IVI 10, CGW 12, NIDS 14, and ECU 16 is an example of the device. Log management module 18 is an example of the information processing device.

CAN bus 6 is an in-vehicle network that communicates in accordance with the CAN protocol, for example, and is included in vehicle 4. TCU 8, IVI 10, CGW 12, NIDS 14, ECU 16, and log management module 18 are connected to one another via CAN bus 6 for enabling communication therebetween.

TCU 8 is a communication module for performing wireless communication with the outside of vehicle 4. TCU 8 is connected to CGW 12 via CAN bus 6. TCU 8 can also be connected to a network (e.g., the Internet) outside of vehicle 4. TCU 8 includes intrusion detection system (IDS) 20 which is an intrusion detection system for detecting an anomaly (e.g., an attack such as anomalous access from outside of vehicle 4) in TCU 8. When an anomaly is detected in TCU 8, IDS 20 transmits anomaly detection information indicating that an anomaly has been detected in TCU 8, to log management module 18 via CAN bus 6.

IVI 10 is an information device for displaying various items of information to the occupant of vehicle 4, and is a car navigation device, for example. IVI 10 is connected to CGW 12 via CAN bus 6. In addition, IVI 10 can also be connected to a network outside of vehicle 4 (e.g., the Internet or the like). IVI 10 includes IDS 22 that is an intrusion detection system for detecting an anomaly in IVI 10. When an anomaly is detected in IVI 10, IDS 22 transmits anomaly detection information indicating that an anomaly has been detected in IVI 10, to log management module 18 via CAN bus 6.

CGW 12 is a central gateway ECU for relaying information (frame) through CAN bus 6. CGW 12 includes IDS 24 that is an intrusion detection system for detecting an anomaly in CGW 12. When an anomaly is detected in CGW 12, IDS 24 transmits anomaly detection information indicating that an anomaly has been detected in CGW 12, to log management module 18 via CAN bus 6.

NIDS 14 is a network-based intrusion detection system (IDS) for detecting an anomaly in the in-vehicle network (CAN bus 6). NIDS 14 is connected to CGW 12 via CAN bus 6. When an anomaly is detected in the in-vehicle network, NIDS 14 transmits anomaly detection information indicating that an anomaly has been detected in the in-vehicle network, to log management module 18 via CAN bus 6.

ECU 16 is an electronic control unit for controlling, for example, acceleration/deceleration, steering, braking, opening/closing of doors and windows of vehicle 4. ECU 16 is connected to CGW 12 via CAN bus 6. ECU 16 includes IDS 26 that is an intrusion detection system for detecting an anomaly in ECU 16. When an anomaly is detected in ECU 16, IDS 26 transmits anomaly detection information indicating that an anomaly has been detected in ECU 16, to log management module 18 via CAN bus 6.

Log management module 18 is connected to CGW 12 via CAN bus 6. When anomaly detection information transmitted from any of IDS 20 of TCU 8, IDS 22 of IVI 10, IDS 24 of CGW 12, NIDS 14, and IDS 26 of ECU 16 is received, log management module 18 narrows down to one or more candidate devices from IDS 20 of TCU 8, IDS 22 of IVI 10, IDS 24 of CGW 12, NIDS 14, and IDS 26 of ECU 16, and collects log information for analysis from the one or more candidate devices. Log management module 18 analyzes the presence or absence of an undetected anomaly in the in-vehicle network, based on the log information for analysis that has been collected. It should be noted that log management module 18 may transmit the log information for analysis that has been collected to another analysis module included in vehicle 4 or to a monitoring center (not illustrated) disposed outside vehicle 4 without performing analysis based on the log information for analysis, and the other analysis module or the monitoring center may perform analysis based on the log information for analysis.

Here, log information for analysis is a log of the communication of the in-vehicle network or the operation of the device that is the target for monitoring in each of IDS 20 of TCU 8, IDS 22 of IVI 10, IDS 24 of CGW 12, NIDS 14, and IDS 26 of ECU 16. It should be noted that the log information for analysis may be a history of information detected in each of IDS 20 of TCU 8, IDS 22 of IVI 10, IDS 24 of CGW 12, NIDS 14, and IDS 26 of ECU 16, or may be information including both the above-described log of the communication or the operation of the device and the above-described history of information that has been detected.

1-2. Functional Configuration of Log Management Module

Figure 2:
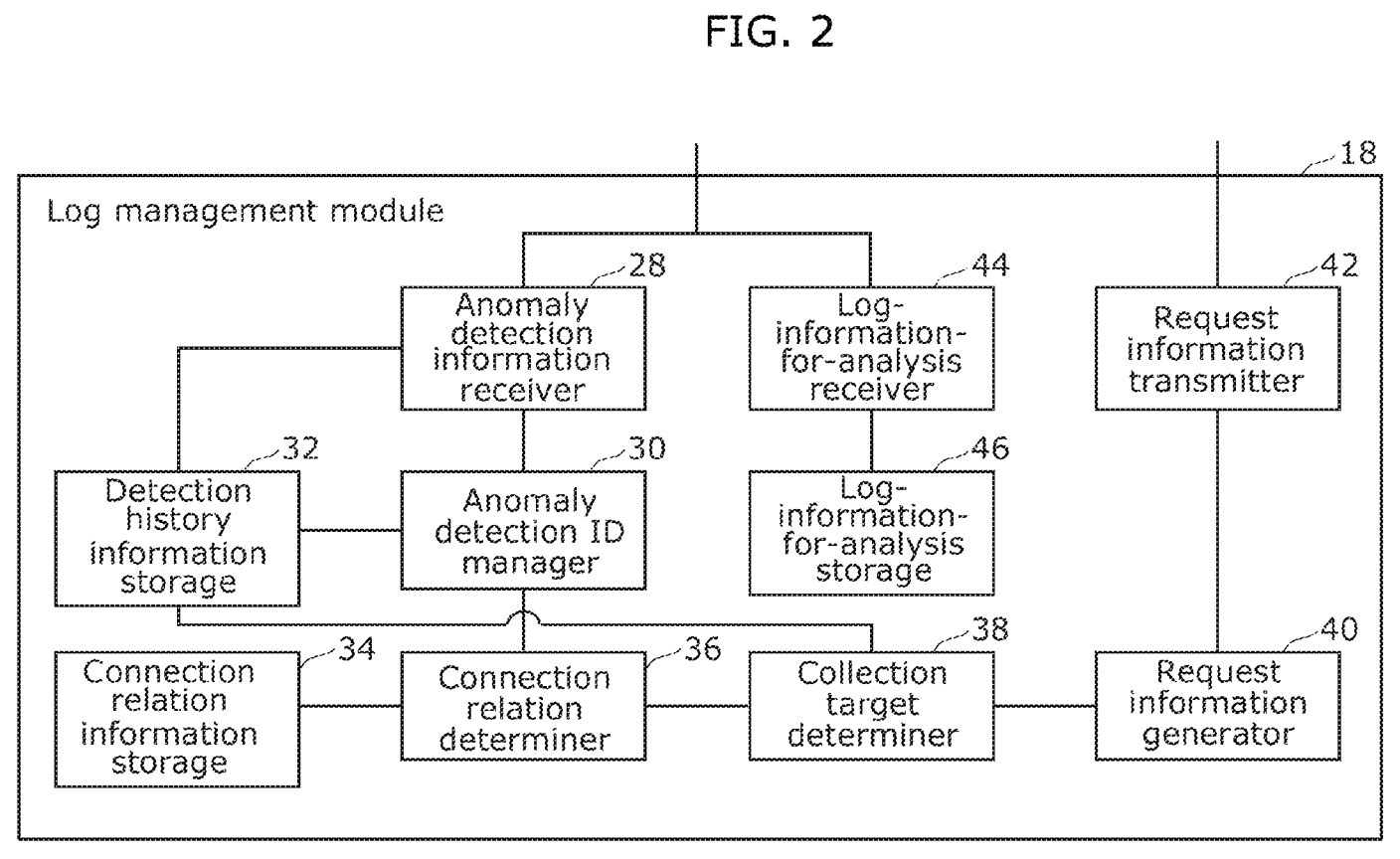

Next, a functional configuration of log management module 18 according to Embodiment 1 will be described with reference to FIG. 2. FIG. 2 is a block diagram illustrating a functional configuration of log management module 18 according to Embodiment 1.

As illustrated in FIG. 2, log management module 18 includes anomaly detection information receiver 28, anomaly detection identification data (ID) manager 30, detection history information storage 32, connection relation information storage 34, connection relation determiner 36, collection target determiner 38, request information generator 40, request information transmitter 42, log-information-for-analysis receiver 44, and log-information-for-analysis storage 46.

Anomaly detection information receiver 28 receives anomaly detection information transmitted from a specific device among IDS 20 of TCU 8, IDS 22 of IVI 10, IDS 24 of CGW 12, NIDS 14, and IDS 26 of ECU 16.

Anomaly detection ID manager 30 specifies the source of the anomaly detection information, based on the anomaly detection information received by anomaly detection information receiver 28, and manages an IDS-ID for identifying the source that has been specified.

Detection history information storage 32 stores detection history information that indicates the association between the anomaly detection information received by anomaly detection information receiver 28 and the IDS-ID for identifying the source of the anomaly detection information.

Connection relation information storage section 34 stores connection relation information indicating the interconnection relation of IDS 20 of TCU 8, IDS 22 of IVI 10, IDS 24 of CGW 12, NIDS 14, and IDS 26 of ECU 16.

Connection relation determiner 36 determines, based on the connection relation information stored in connection relation information storage 34, one or more candidate devices which are in a predetermined connection relation with the specific device that is the source of the anomaly detection information received by anomaly detection information receiver 28. According to the present embodiment, a predetermined connection relation means a connection relation in which a device is directly connected to a specific device (without the intervention of other devices) via CAN bus 6. For example, when an anomaly is detected in IDS 24 of CGW 12, connection relation determiner 36 determines IDS 20 of TCU 8, IDS 22 of IVI 10, and NIDS 14 as devices which are in a predetermined connection relation with IDS 24 of CGW 12. It should be noted that the predetermined connection relation is not limited to the meaning described above, and may mean, for example, a connection relation in which there is a logical connection relation with a specific device and no other IDS is present on the logical path to the specific device.

Collection target determiner 38, upon receipt of the anomaly detection information by anomaly detection information receiver 28, narrows down one or more candidate devices from IDS 20 of TCU 8, IDS 22 of IVI 10, IDS 24 of CGW 12, NIDS 14, and IDS 26 of ECU 16, and determines the one or more candidate devices as collection targets whose log information for analysis is to be collected. More specifically, based on the connection relation information stored in connection relation information storage 34 and the detection history information stored in detection history information storage 32, collection target determiner 38 determines, as the collection targets whose log information for analysis is to be collected, one or more candidate devices which are in a predetermined connection relation with the specific device that is the source of the anomaly detection information, and have no history of anomaly detection.

Request information generator 40 generates request information to request the transmission of log information for analysis, to the one or more candidate devices determined by collection target determiner 38.

Request information transmitter 42 transmits the request information generated by request information generator 40 to the one or more candidate devices determined by collection target determiner 38.

Log-information-for-analysis receiver 44 receives the log information for analysis transmitted from the one or more candidate devices in response to the request information.

Log-information-for-analysis storage 46 stores the log information for analysis received by log-information-for-analysis receiver 44.

1-3. Operation of Log Management Module

Figure 3:
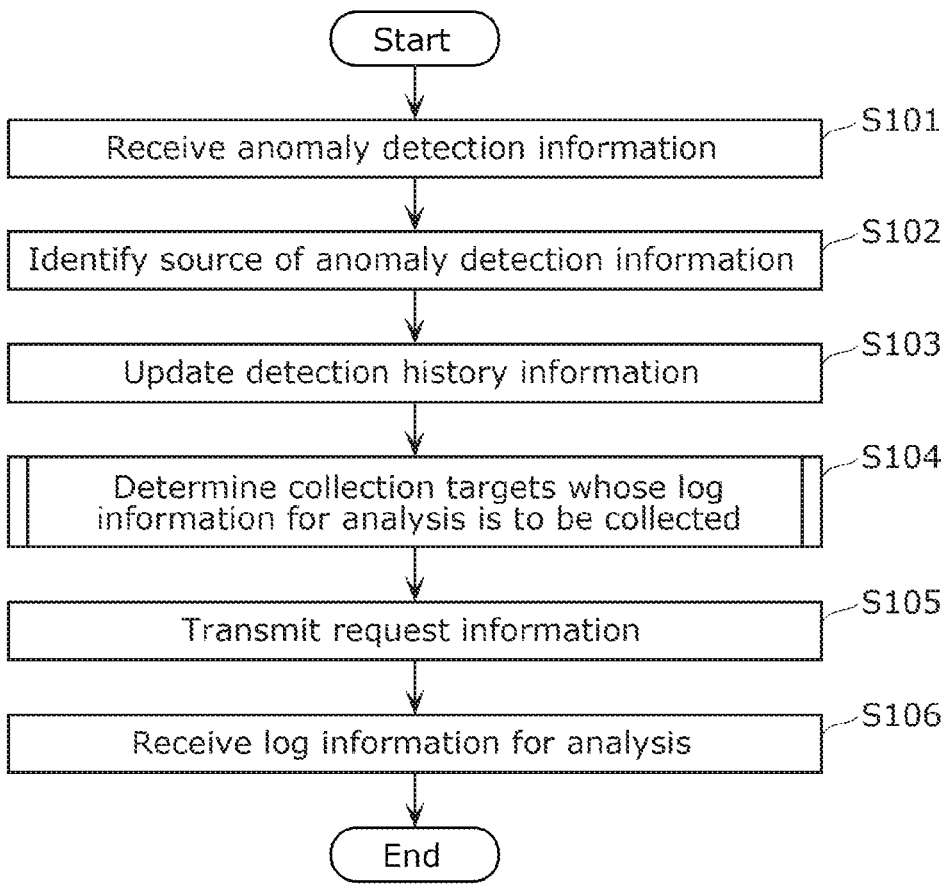
FIG. 3 is a flowchart illustrating the flow of the operation performed by the log management module according to Embodiment 1.

The following describes an operation performed by log management module 18 according to Embodiment 1, with reference to FIG. 3. FIG. 3 is a flowchart illustrating the flow of the operation performed by log management module 18 according to Embodiment 1.

As illustrated in FIG. 3, first, anomaly detection information receiver 28 receives anomaly detection information from any of IDS 20 of TCU 8, IDS 22 of IVI 10, IDS 24 of CGW 12, NIDS 14, and IDS 26 of ECU 16 (S101).

Anomaly detection ID manager 30 identifies the source of the anomaly detection information, based on the anomaly detection information received by anomaly detection information receiver 28 (S102), and updates detection history information stored in detection history information storage 32 (S103).

Collection target determiner 38 narrows down one or more candidate devices from IDS 20 of TCU 8, IDS 22 of IVI 10, IDS 24 of CGW 12, NIDS 14, and IDS 26 of ECU 16, and determines the one or more candidate devices as collection targets whose log information for analysis is to be collected (S104).

Request information transmitter 42 transmits the request information generated by request information generator 40 to the one or more candidate devices determined by collection target determiner 38 (S105).

Log-information-for-analysis receiver 44 receives the log information for analysis transmitted from the one or more candidate devices in response to the request information (S106).

Figure 4:
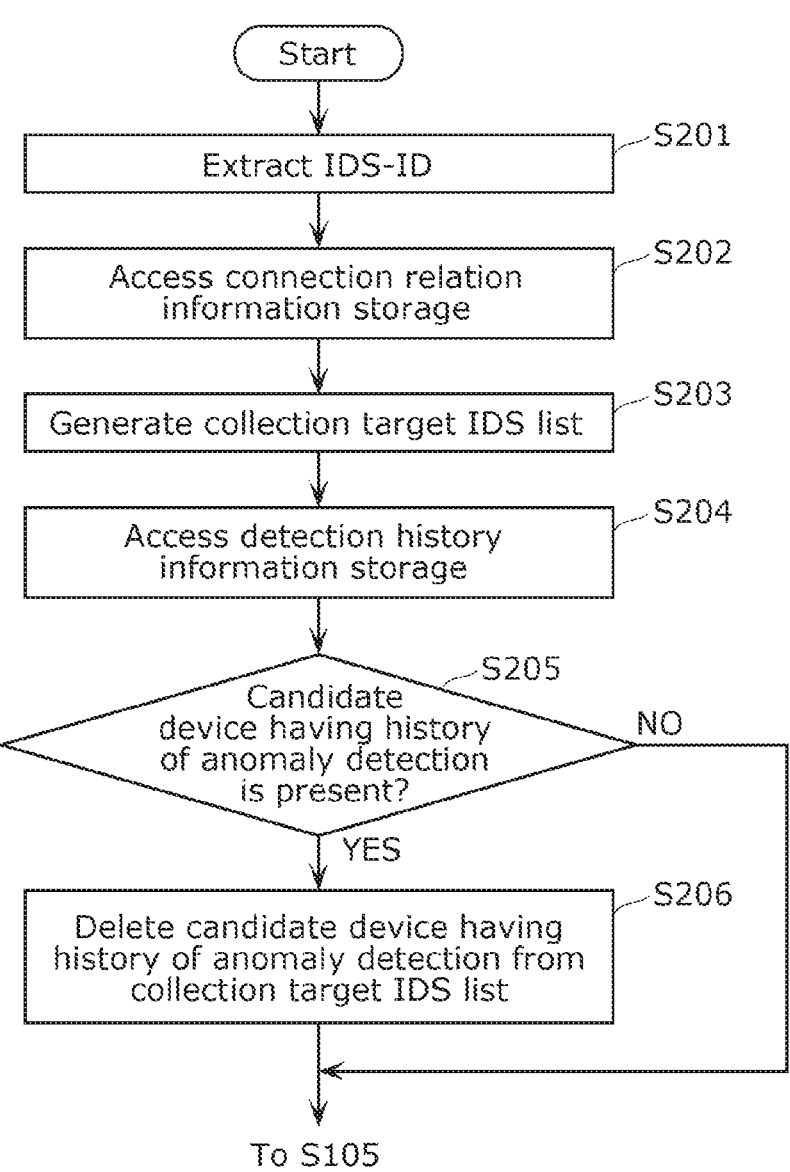
FIG. 4 is a flowchart specifically illustrating the details of the process of determining the collection targets whose log information for analysis is to be collected in the flowchart in FIG. 3.
Figure 5:
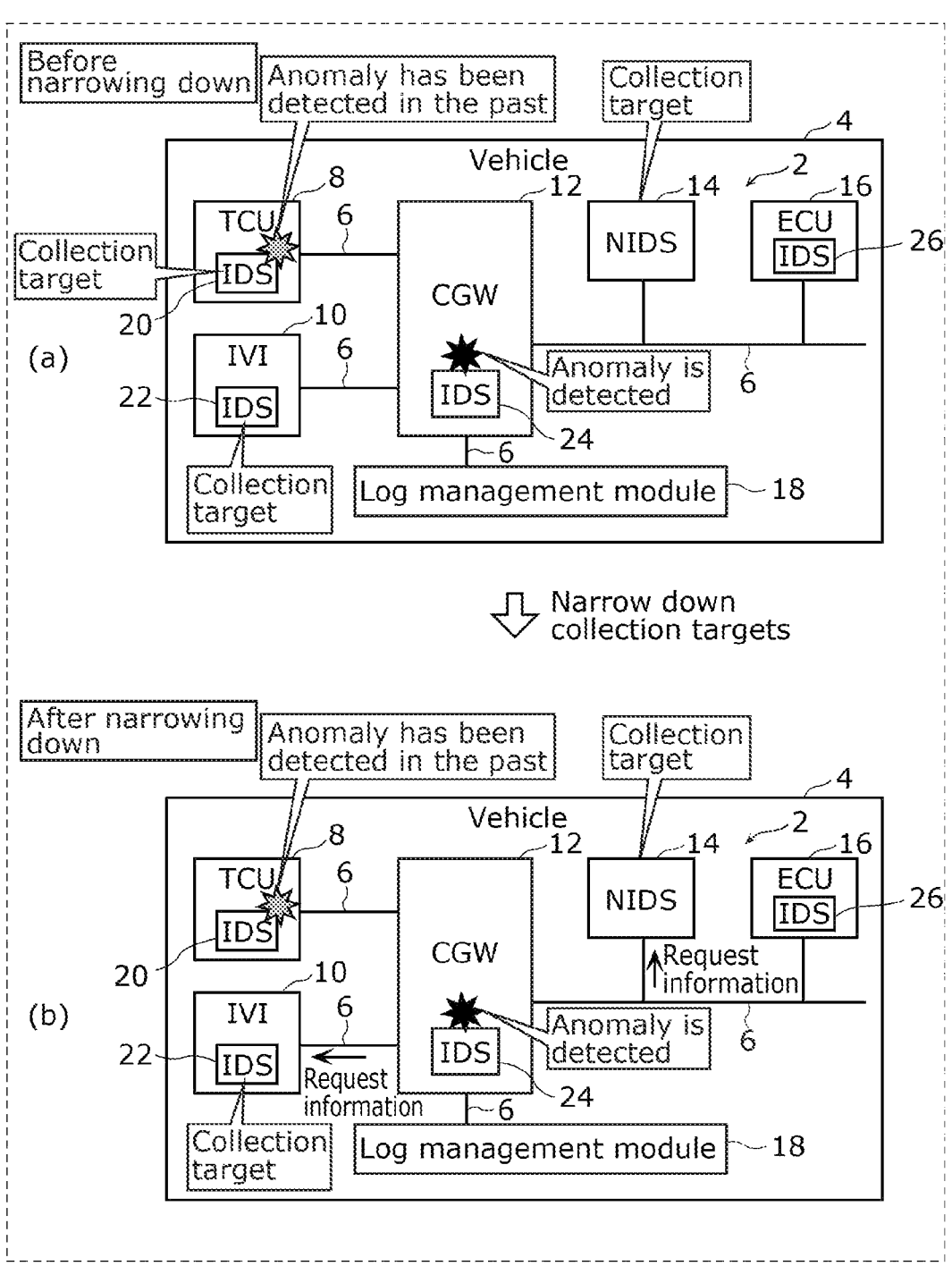
FIG. 5 is a diagram illustrating the operation performed by the log management module according to Embodiment 1.

Here, the process of determining the collection targets whose log information for analysis is to be collected (S104) in the flowchart in FIG. 3 will be described in detail with reference to FIG. 4 and FIG. 5. FIG. 4 is a flowchart specifically illustrating the details of the process of determining the collection targets whose log information for analysis is to be collected in the flowchart in FIG. 3. FIG. 5 is a diagram illustrating the operation performed by log management module 18 according to Embodiment 1.

The following describes the case where an anomaly is detected in IDS 24 of CGW 12 and anomaly detection information receiver 28 receives anomaly detection information from IDS 24 of CGW 12, as illustrated in (a) of FIG. 5.

As illustrated in FIG. 4, collection target determiner 38 extracts an IDS-ID corresponding to the anomaly detection information received by anomaly detection information receiver 28, from detection history information stored in detection history information storage 32 (S201). The IDS-ID is an ID for identifying IDS 24 of CGW 12 which is the source of the anomaly detection information.

By accessing connection relation information storage 34 (S202), connection relation determiner 36 determines IDS 20 of TCU 8, IDS 22, and NIDS 14 of IVI 10, as devices which are in a predetermined connection relation with IDS 24 of CGW 12 indicated by the IDS-ID that has been extracted.

Collection target determiner 38 generates a collection target IDS list, on the basis of a result of the determination performed by connection relation determiner 36 (S203). The collection target IDS list is a list of candidate devices that are the collection targets whose log information for analysis is to be collected. The collection target IDS list includes IDS 20 of TCU 8, IDS 22 of IVI 10, and NIDS 14 as the collection targets whose log information for analysis is to be collected. In the example illustrated in (a) in FIG. 5, at this point, collection target determiner 38 tentatively determines IDS 20 of TCU 8, IDS 22 of IVI 10, and NIDS 14 as the collection targets whose log information for analysis is to be collected.

By accessing detection history information storage 32 (S204), collection target determiner 38 determines whether any candidate devices having a history of anomaly detection are present in the collection target IDS list (S205).

When any candidate devices having a history of anomaly detection are present in the collection target IDS list (YES in S205), collection target determiner 38 deletes the candidate devices having a history of anomaly detection from the collection target IDS list (S206), thereby narrowing down the collection targets whose log information for analysis is to be collected. Then, the process proceeds to step S105 of the flowchart in FIG. 3. In the example illustrated in (b) in FIG. 5, collection target determiner 38 finally determines IDS 22 of IVI 10 and NIDS 14 as the collection targets whose log information for analysis is to be collected, by deleting IDS 20 of TCU 8 which has a history of anomaly detection from the collection target IDS list.

Returning to step S205, when no candidate device having a history of anomaly detection is present in the collection target IDS list (NO in S205), the process proceeds to step S105 of the flowchart in FIG. 3. In this case, collection target determiner 38 maintains the candidate devices included in the collection target IDS list generated in step S203 described above, and does not narrow down the collection targets whose log information for analysis is to be collected. Although not illustrated in the diagram, collection target determiner 38, for example, finally determines IDS 20 of TCU 8, IDS 22 of IVI 10, and NIDS 14 as the collection targets whose log information for analysis is to be collected.

1-4. Advantageous Effects

According to the present embodiment, collection target determiner 38 determines, based on connection relation information and detection history information, one or more candidate devices which are in a predetermined connection relation with the source of anomaly detection information, and have no history of anomaly detection, as the collection targets whose log information for analysis is to be collected.

A candidate device having a history of anomaly detection is considered to be less likely to have a new unknown attack. For that reason, it is possible to avoid wastefully collecting log information for analysis, by excluding, even when a candidate device is in a predetermined connection relation with the source of anomaly detection information, the candidate device having a history of anomaly detection from the collection targets whose log information for analysis is to be collected. As a result, the log information for analysis can be collected appropriately, and it is possible to inhibit the remaining storage capacity of log-information-for-analysis storage 46 from becoming insufficient. In addition, it is possible to reduce the amount of communication when collecting log information for analysis and when transmitting the log information for analysis to the monitoring center, etc.

1-5. Variation 1

Figure 6:
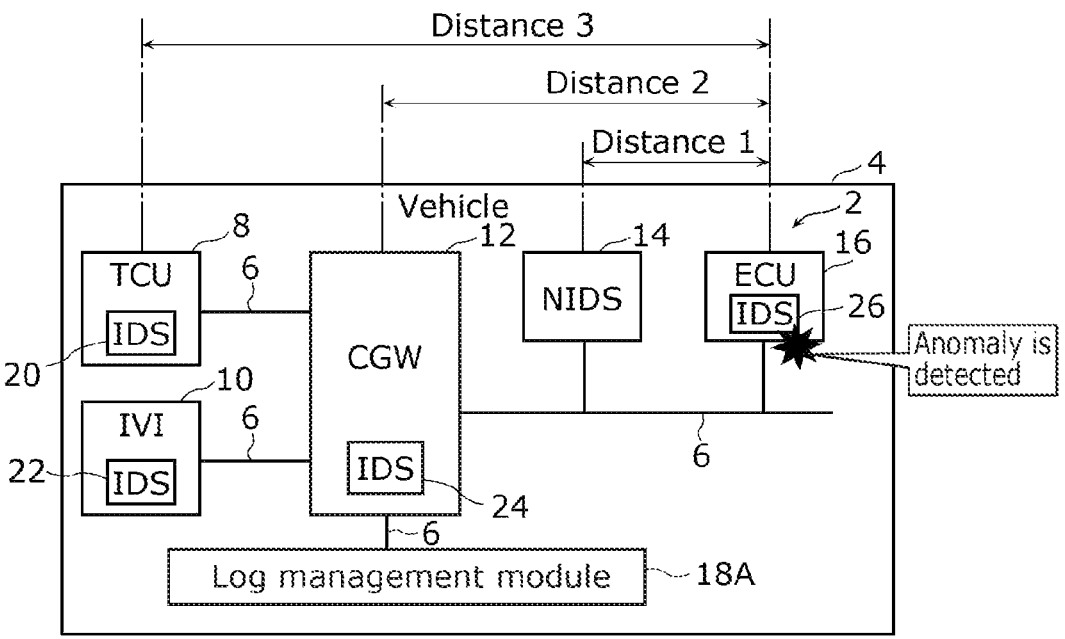
FIG. 6 is a diagram illustrating the function of a log management module according to Variation 1 of Embodiment 1.
Figure 8:
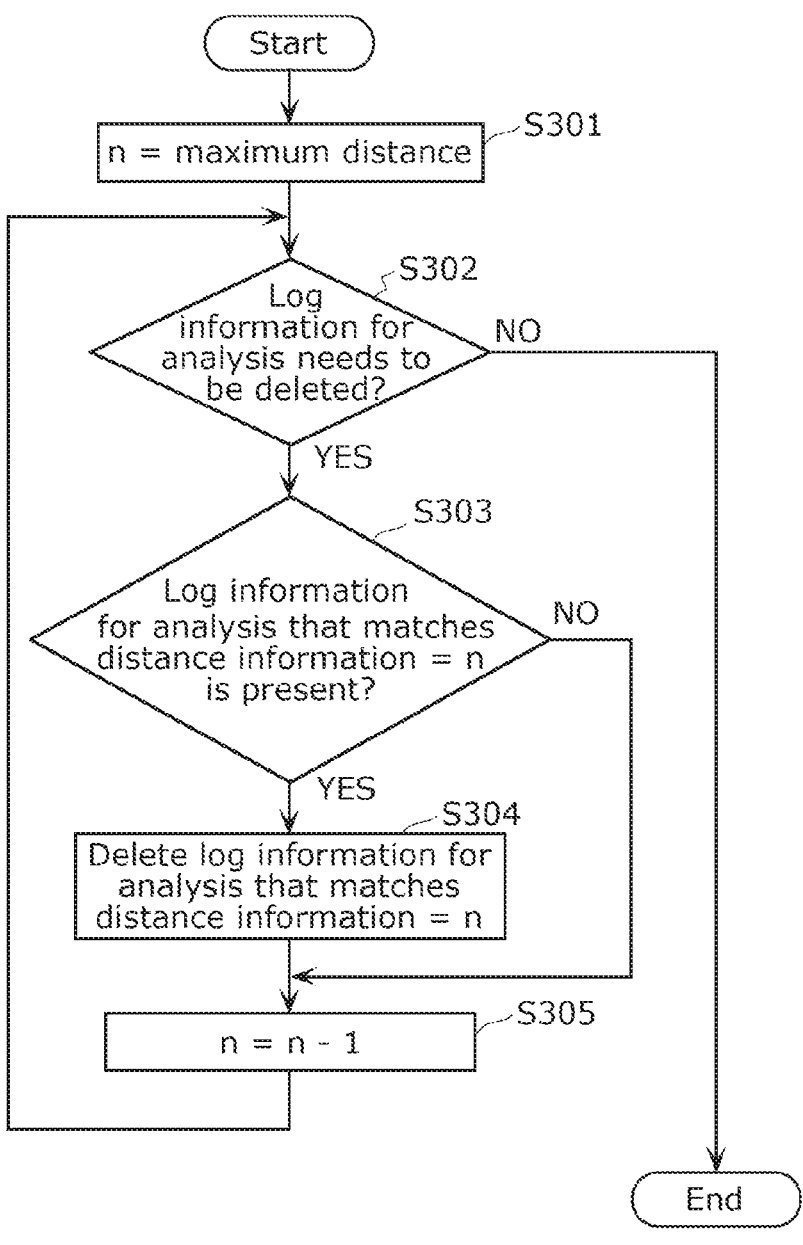
FIG. 8 is a flowchart illustrating the flow of the operation performed by the log management module according to Variation 1 of Embodiment 1.

The following describes a function of log management module 18A according to Variation 1 of Embodiment 1, with reference to FIG. 6 to FIG. 8. FIG. 6 is a diagram illustrating the function of log management module 18A according to Variation 1 of Embodiment 1. FIG. 7 is a diagram illustrating an example of management table 48 according to Variation 1 of Embodiment 1. FIG. 8 is a flowchart illustrating the flow of the operation performed by log management module 18A according to Variation 1 of Embodiment 1.

In log management module 18A according to the present variation, for example, when the remaining storage capacity of log-information-for-analysis storage 46 (see FIG. 2) becomes tight, the log information for analysis stored in log-information-for-analysis storage 46 is deleted in sequence.

As illustrated in FIG. 6, for example, when an anomaly is detected in IDS 26 of ECU 16, anomaly detection information receiver 28 (see FIG. 2) receives anomaly detection information (hereinafter referred to as "anomaly detection information A") from IDS 26 of ECU 16. Request information transmitter 42 (see FIG. 2) transmits request information to each of IDS 20 of TCU 8, IDS 22 of IVI 10, IDS 24 of CGW 12, and NIDS 14. Log-information-for-analysis receiver 44 (see FIG. 2) receives log information for analysis transmitted from each of IDS 20 of TCU 8, IDS 22 of IVI 10, IDS 24 of CGW 12, and NIDS 14.

In log management module 18A, management table 48 illustrated in FIG. 7 is generated upon receipt of the log information for analysis. Management table 48 is an example of association information that indicates, for each type of anomaly detection information, the association between log information for analysis and distance information as the effectiveness related to the degree of the effectiveness of the log information for analysis. The effectiveness is determined based on the distance between the specific device in which the anomaly has been detected and the source of the log information for analysis. It should be noted that, although the distance information is included in management table 48 in the example illustrated in FIG. 7, the present disclosure is not limited to this. The distance information between the devices may be managed as distance information between devices, and the distance information may be derived from the device in which an anomaly has occurred and the above-described distance information between devices, each time it is needed.

In the example illustrated in FIG. 7, in regard to anomaly detection information A, distance information "1" corresponding to "NIDS log 1" (log information for analysis from NIDS 14), distance information "2" corresponding to "CGW log 1" (log information for analysis from IDS 24 of CGW 12), distance information "3" corresponding to TCU log 1 (log information for analysis from IDS 20 of TCU 8), distance information "3" corresponding to "TCU log 1" (log information for analysis from IDS 20 of TCU 8), and distance information "3" corresponding to IVI log 1 (log information for analysis from IDS 22 of IVI 10) are stored, respectively, in management table 48.

Here, the distance information is information indicating the distance between IDS 26 of ECU 16 in which anomaly has been detected and the source of the log information for analysis. As illustrated in FIG. 6, the distance between IDS 26 of ECU 16 and IDS 20 of TCU 8 and the distance between IDS 26 of ECU 16 and IDS 22 of IVI 10 are each "3" which is the longest, the distance between IDS 26 of ECU 16 and IDS 24 of CGW 12 is "2" which is the second longest, and the distance between IDS 26 of ECU 16 and NIDS 14 is "1" which is the shortest. In the present variation, it is a prerequisite that the closer the device is to the specific device in which anomaly has been detected, the more likely it is that a new unknown attack has occurred. Therefore, the shorter the distance indicated by the distance information, the higher the effectiveness.

In log management module 18A, based on management table 48 illustrated in FIG. 7, the log information for analysis stored in log-information-for-analysis storage 46 is deleted in descending order of distance indicated by the distance information. The following describes the deletion process of log information for analysis in log management module 18A with reference to FIG. 8.

As illustrated in FIG. 8, distance information n=maximum distance (e.g., "3") is set (S301), and it is determined whether the log information for analysis stored in log-information-for-analysis storage 46 needs to be deleted (S302). For example, when there is no need to delete the log information for analysis stored in log-information-for-analysis storage 46 (NO in S302) because there is a sufficient remaining storage capacity in log-information-for-analysis storage 46, the process is ended.

On the other hand, for example, when it is necessary to delete the log information for analysis stored in log-information-for-analysis storage 46 because the remaining storage capacity of log-information-for-analysis storage 46 is tight (YES in S302), it is determined whether log information for analysis that matches distance information=n is present, by referring to management table 48 (S303).

When log information for analysis that matches distance information=n is present (YES in S303), log-information-for-analysis receiver 44 deletes the log information for analysis that matches distance information=n (e.g., "TCU log 1" and "IVI log 1") (S304). Then, distance information n is decremented to n−1 (e.g., "2") (S305), and the process returns to step S302 described above.

Returning to step S303, when no log information for analysis that matches distance information=n is not present ("NO" in S303), the process proceeds to step S305.

In the present variation, it is a prerequisite that the closer the device is to the specific device in which anomaly has been detected, the more likely it is that a new unknown attack has occurred, and thus the shorter the distance indicated by the distance information, the higher the effectiveness. As a result, by deleting the log information for analysis stored in log-information-for-analysis storage 46 in descending order of distance indicated by the distance information as described above, it is possible to accumulate highly useful log information for analysis in log-information-for-analysis storage 46, and it is also possible to prevent the remaining storage capacity of log-information-for-analysis storage 46 from becoming tight.

1-6. Variation 2

Figure 9:
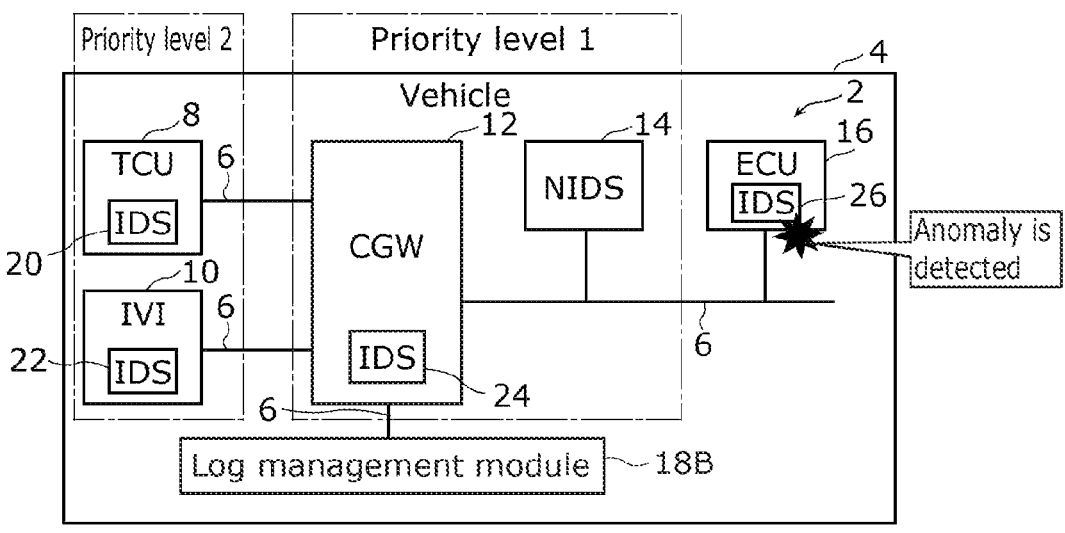
FIG. 9 is a diagram illustrating the function of a log management module according to Variation 2 of Embodiment 1.
Figure 11:
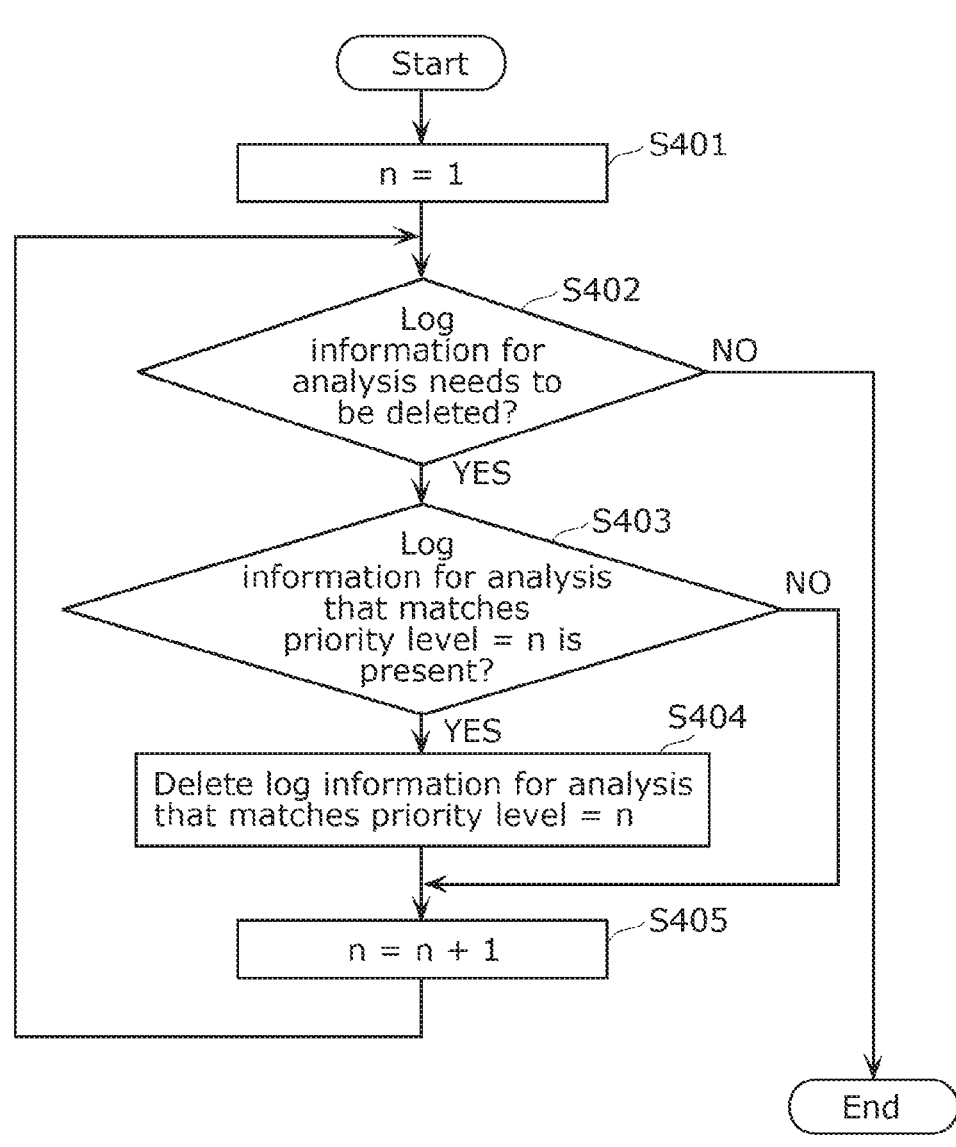
FIG. 11 is a flowchart illustrating the flow of the operation performed by the log management module according to Variation 2 of Embodiment 1.

The following describes a function of log management module 18B according to Variation 2 of Embodiment 1, with reference to FIG. 9 to FIG. 11. FIG. 9 is a diagram illustrating the function of log management module 18B according to Variation 2 of Embodiment 1. FIG. 10 is a diagram illustrating an example of management table 50 according to Variation 2 of Embodiment 1. FIG. 11 is a flowchart illustrating the flow of the operation performed by log management module 18B according to Variation 2 of Embodiment 1.

In log management module 18B according to the present variation, for example, when the remaining storage capacity of log-information-for-analysis storage 46 (see FIG. 2) becomes tight, the log information for analysis stored in log-information-for-analysis storage 46 is deleted in sequence.

As illustrated in FIG. 9, for example, when an anomaly is detected in IDS 26 of ECU 16, anomaly detection information receiver 28 (see FIG. 2) receives anomaly detection information (hereinafter referred to as "anomaly detection information A") from IDS 26 of ECU 16. Request information transmitter 42 (see FIG. 2) transmits request information to each of IDS 20 of TCU 8, IDS 22 of IVI 10, IDS 24 of CGW 12, and NIDS 14. Log-information-for-analysis receiver 44 (see FIG. 2) receives log information for analysis transmitted from each of IDS 20 of TCU 8, IDS 22 of IVI 10, IDS 24 of CGW 12, and NIDS 14.

In log management module 18B, management table 50 illustrated in FIG. 10 is generated upon receipt of the log information for analysis. Management table 50 is an example of association information that indicates, for each type of anomaly detection information, the association between log information for analysis and a priority level as the effectiveness related to the degree of the effectiveness of the log information for analysis. The effectiveness is determined based on the position of the source of log information for analysis relative to the specific device in which an anomaly is detected. It should be noted that, although the priority level is included in management table 50 in the example illustrated in FIG. 10, the present disclosure is not limited to this. The priority level of each of the devices may be managed as device priority information, and the priority level may be derived, each time it is needed, from the device that is the source of log information for analysis and the device priority information described above. In addition, a plurality of items of the above-described device priority information may be stored, and the device priority information to be referred to may be changed according to details of anomaly detection, a detection portion, a vehicle status, etc.

In the example illustrated in FIG. 10, for anomaly detection information A, the priority level "1" corresponding to "NIDS log 1" (log information for analysis from NIDS 14), the priority level "1" corresponding to "CGW log 1" (log information for analysis from IDS 24 of CGW 12), the priority level "2" corresponding to "TCU log 1" (log information for analysis from IDS 20 of TCU 8), and the priority level "2" corresponding to "IVI log 1" (log information for analysis from IDS 22 of IVI 10) are stored in management table 50.

Here, the priority level is information that indicates a higher index as the position is closer to the entrance of the in-vehicle network (left side in FIG. 9) and a lower index as the position is closer to the exit of the in-vehicle network (right side in FIG. 9). As illustrated in FIG. 9, the priority levels of IDS 20 of TCU 8 and IDS 22 of IVI 10 are each "2" because they are relatively close to the entrance of the in-vehicle network. In addition, the priority levels of IDS 24 of CGW 12 and NIDS 14 are each "1" because they are relatively far from the entrance of the in-vehicle network.

According to the present variation, it is a prerequisite that the log information for analysis from a device closer to the entrance of the in-vehicle network is more important for identifying the start position of attack. Therefore, the higher the priority level is, the higher the effectiveness is.

It should be noted that, it has been described, in the example illustrated in FIG. 9, that the priority level is lower as the position is farther from the entrance of the in-vehicle network, but the priority level of a device that is considered important for security or vehicle control may be placed high even when the position is far from the entrance of the in-vehicle network, regardless of the distance from the entrance of the in-vehicle network.

As such a device, for example, an ECU that intensively performs control, such as an advanced driver assist system ECU (ADAS-ECU) and an automatic driving ECU, or a gateway in which communication is centralized. In addition, the priority level may be changed according to a communication state and a driving status of vehicle 4 at the time of anomaly detection.

In log management module 18B, based on management table 50 illustrated in FIG. 10, the log information for analysis stored in log-information-for-analysis storage 46 is deleted in ascending order of priority level. The following describes the deletion process of log information for analysis in log management module 18B with reference to FIG. 11.

As illustrated in FIG. 11, priority level n=1 is set (S401), and it is determined whether the log information for analysis stored in log information storage 46 needs to be deleted (S402). For example, when there is no need to delete the log information for analysis stored in log-information-for-analysis storage 46 (NO in S402) because there is a sufficient remaining storage capacity in log-information-for-analysis storage 46, the process is ended.

On the other hand, for example, when it is necessary to delete the log information for analysis stored in log-information-for-analysis storage 46 because the remaining storage capacity of log-information-for-analysis storage 46 is tight (YES in S402), it is determined whether the log information for analysis that matches priority level=n is present, by referring to management table 50 (S403).

When log information for analysis that matches priority level=n is present ("YES" in S403), log-information-for-analysis receiver 44 deletes the log information for analysis that matches priority level=n (e.g., "NIDS log 1" and "CGW log 1") (S404). Then, priority level n is incremented to n+1 (=2) (S405), and the process returns to step S402 described above.

Returning to step S403, when no log information for analysis that matches priority level=n is present ("NO" in S403), the process proceeds to step S405.

According to the present variation, it is a prerequisite that the log information for analysis from a device closer to the entrance of the in-vehicle network is more important for identifying the start position of attack, and thus the higher the priority level is, the higher the effectiveness is. For that reason, by deleting the log information for analysis stored in log-information-for-analysis storage 46 in ascending order of priority level as described above, it is possible to accumulate highly useful log information for analysis in log-information-for-analysis storage 46, and it is also possible to prevent the remaining storage capacity of log-information-for-analysis storage 46 from becoming tight.

Embodiment 2

2-1. Functional Configuration of Log Management Module

Next, a functional configuration of log management module 18C according to Embodiment 2 will be described with reference to FIG. 12. FIG. 12 is a block diagram illustrating a functional configuration of log management module 18C according to Embodiment 2. It should be noted that, in each of the embodiments described below, the same structural components as the above-described Embodiment 1 are assigned with the same reference signs, and redundant descriptions will be omitted.

As illustrated in FIG. 12, log management module 18C according to Embodiment 2 includes attack route information storage 52 and attack route estimator 54 in addition to the structural components described in Embodiment 1 above.

Attack route information storage 52 stores attack route information indicating a candidate for an attack route in the in-vehicle network. The attack route information is information which indicates the route that an attack from outside of vehicle 4 is expected to follow, such as "IDS 20 of TCU 8→IDS 24 of CGW 12→NIDS 14→IDS 26 of ECU 16".

Attack route estimator 54 estimates an attack route including the device in which an anomaly is detected, based on the attack route information stored in attack route information storage 52.

In addition, collection target determiner 38C determines, as collection targets whose log information for analysis is to be collected, one or more candidate devices which are present on the attack route estimated by attack route estimator 54.

2-2. Operation of Log Management Module

Figure 13:
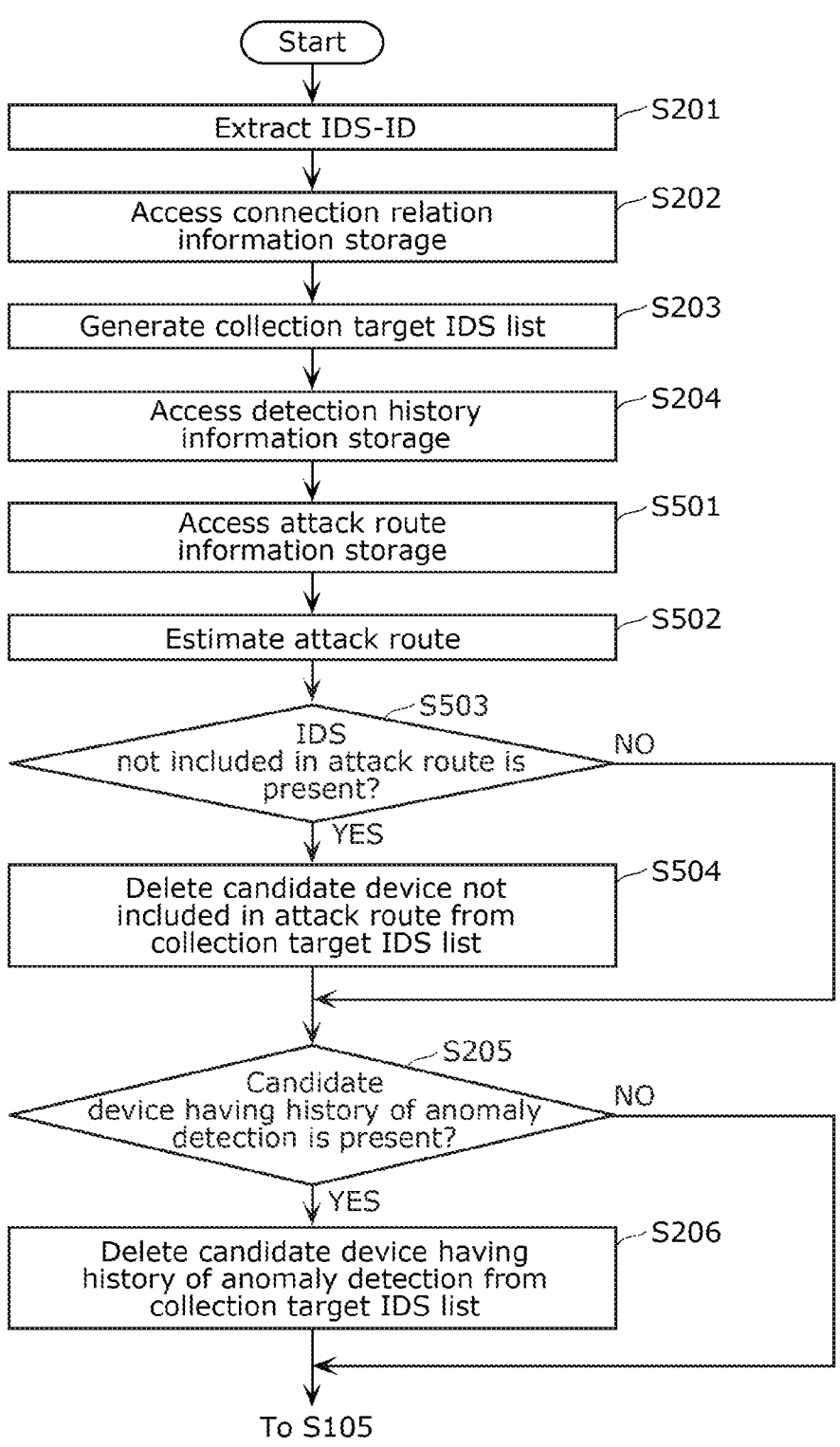
FIG. 13 is a flowchart illustrating the flow of the operation performed by the log management module according to Embodiment 2.
Figure 14:
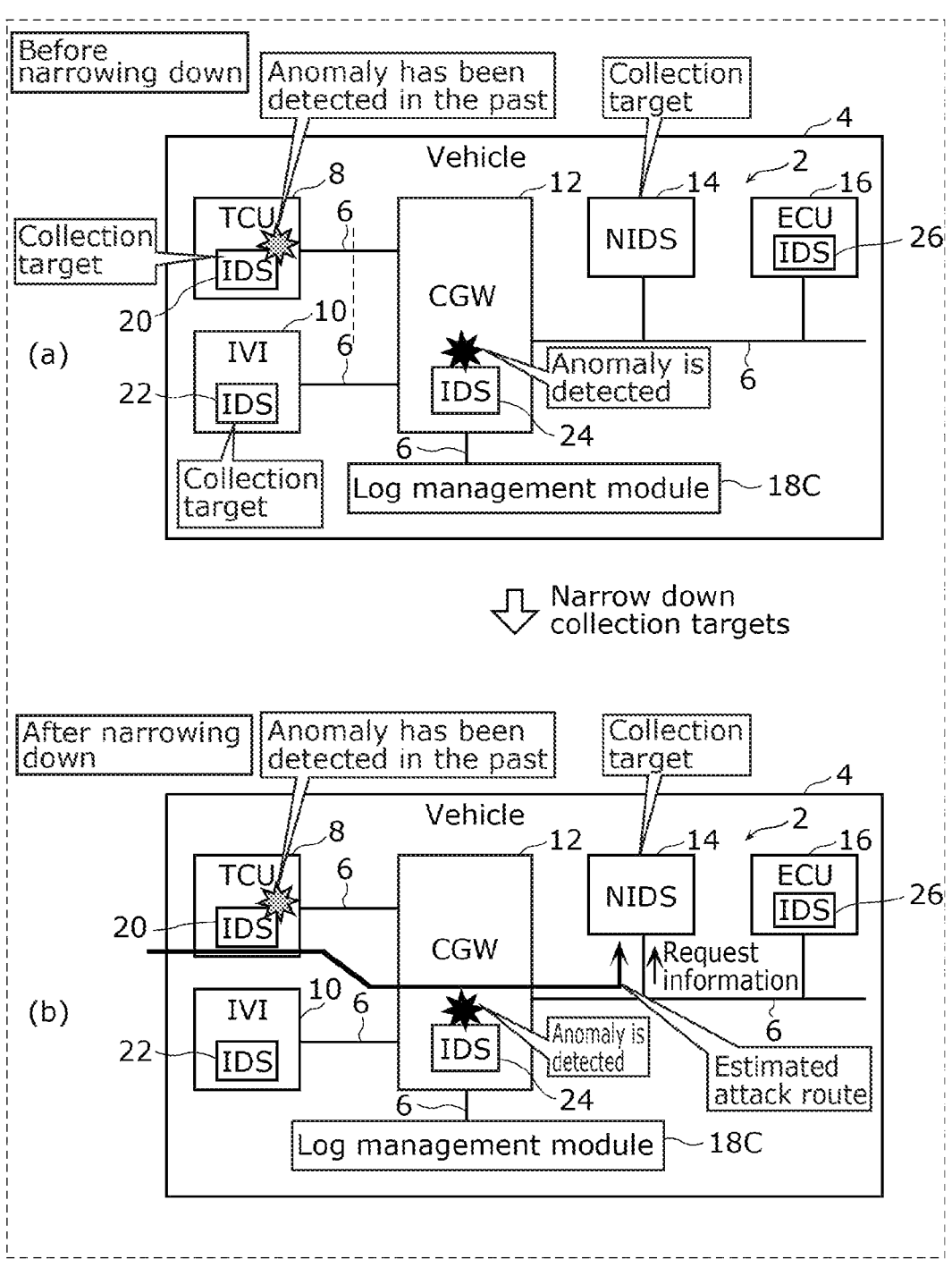
FIG. 14 is a diagram illustrating the operation performed by the log management module according to Embodiment 2.

The following describes an operation (process of determining collection targets whose log information for analysis is to be collected) performed by log management module 18C according to Embodiment 2, with reference to FIG. 13 and FIG. 14. FIG. 13 is a flowchart illustrating the flow of the operation performed by log management module 18C according to Embodiment 2. FIG. 14 is a diagram illustrating the operation performed by log management module 18C according to Embodiment 2. It should be noted that, in the flowchart illustrated in FIG. 13, the same processes as those indicated in the flowchart of FIG. 4 are assigned with the same step numbers, and redundant descriptions will be omitted The following describes the case where an anomaly is detected in IDS 24 of CGW 12 and anomaly detection information receiver 28 receives anomaly detection information from IDS 24 of CGW 12, as illustrated in (a) of FIG. 14.

As illustrated in FIG. 13, steps S201 to S203 are performed in the same manner as Embodiment 1 described above. The collection target IDS list generated in step S203 includes IDS 20 of TCU 8, IDS 22 of IVI 10, and NIDS 14 as the collection targets whose log information for analysis is to be collected. In the example illustrated in (a) in FIG. 14, at this point, collection target determiner 38C tentatively determines IDS 20 of TCU 8, IDS 22 of IVI 10, and NIDS 14 as the collection targets whose log information for analysis is to be collected.

By accessing detection history information storage 32 (S204), collection target determiner 38C determines whether a candidate device having a history of anomaly detection is present in the candidate devices included in the collection target IDS list.

By accessing attack route information storage 52 (S501), attack route estimator 54 estimates the attack route including IDS 24 of CGW 12 in which an anomaly is detected (S502), based on the attack route stored in attack route information storage 52. In the example illustrated in (b) in FIG. 14, attack route estimator 54 estimates an attack route "IDS 20 of TCU 8→IDS 24 of CGW 12→NIDS 14".

Collection target determiner 38C determines whether a candidate device that is not included in the attack route estimated by attack route estimator 54 is present in the collection target IDS list (S503). When a candidate device that is not included in the attack route estimated by attack route estimator 54 is not present in the collection target IDS list (NO in S503), the process proceeds to step S205 described above.

When a candidate device that is not included in the attack route estimated by attack route estimator 54 is present in the collection target IDS list (YES in S503), collection target determiner 38C narrows down the collection targets whose log information for analysis is to be collected, by deleting such a candidate device from the collection target IDS list (S504). In the example illustrated in (b) in FIG. 14, collection target determiner 38C deletes, from the collection target IDS list, IDS 22 of IVI 10 which is not included the attack route estimated by attack route estimator 54.

Then, collection target determiner 38C determines whether any candidate devices having a history of anomaly detection are present in the collection target IDS list (S205).

When any candidate devices having a history of anomaly detection are present in the collection target IDS list (YES in S205), collection target determiner 38C further narrows down the collection targets whose log information for analysis is to be collected, by deleting the candidate devices having a history of anomaly detection from the collection target IDS list (S206). Then, the process proceeds to step S105 of the flowchart in FIG. 3. In the example illustrated in (b) in FIG. 14, collection target determiner 38C deletes IDS 20 of TCU 8 which has a history of anomaly detection, from the collection target IDS list. In this manner, collection target determiner 38C finally determines NIDS 14 as the collection targets whose log information for analysis is to be collected.

Returning to step S205, when no candidate device having a history of anomaly detection is present in the collection target IDS list (NO in S205), the process proceeds to step S105 of the flowchart in FIG. 3. In this case, although not illustrated in the diagram, collection target determiner 38C, for example, finally determines IDS 20 of TCU 8 and NIDS 14 as the collection targets whose log information for analysis is to be collected.

It should be noted that, although steps S205 and S206 are performed according to the present embodiment, the processes of steps S205 and S206 need not necessarily be performed, and these processes may be omitted.

In addition, although the attack route is estimated by performing steps S204, S501, and S502 after performing steps S202 and S203, and the collection targets are narrowed down from the obtained collection target IDS list according to the present embodiment, the collection targets may be narrowed down using information output in step S202 from the IDSs included in the attack route, by performing steps S204, S501, and S502 after performing step S201, and then performing steps S202 and S203. Alternatively, IDSs included in the attack route may be determined as the collection targets whose log information for analysis is to be collected, by performing steps S204, S501, and S502 and not performing steps S202 and S203.

2-3. Advantageous Effects

According to the present embodiment, collection target determiner 38C determines, as the collection targets whose log information for analysis is to be collected, one or more candidate devices included in the attack route estimated by attack route estimator 54.

A candidate device which is not present on the attack route estimated by attack route estimator 54 is considered to be less likely to have a new unknown attack. Therefore, it is possible to avoid wastefully collecting log information for analysis, by excluding, even when a candidate device is in a predetermined connection relation with the source of anomaly detection information, the candidate device which is not present on the estimated attack route from the collection targets whose log information for analysis is to be collected. As a result, the log information for analysis can be collected appropriately, and it is possible to inhibit the remaining storage capacity of log-information-for-analysis storage 46 from becoming insufficient.

Embodiment 3

3-1. Functional Configuration of Log Management Module

Figure 15:
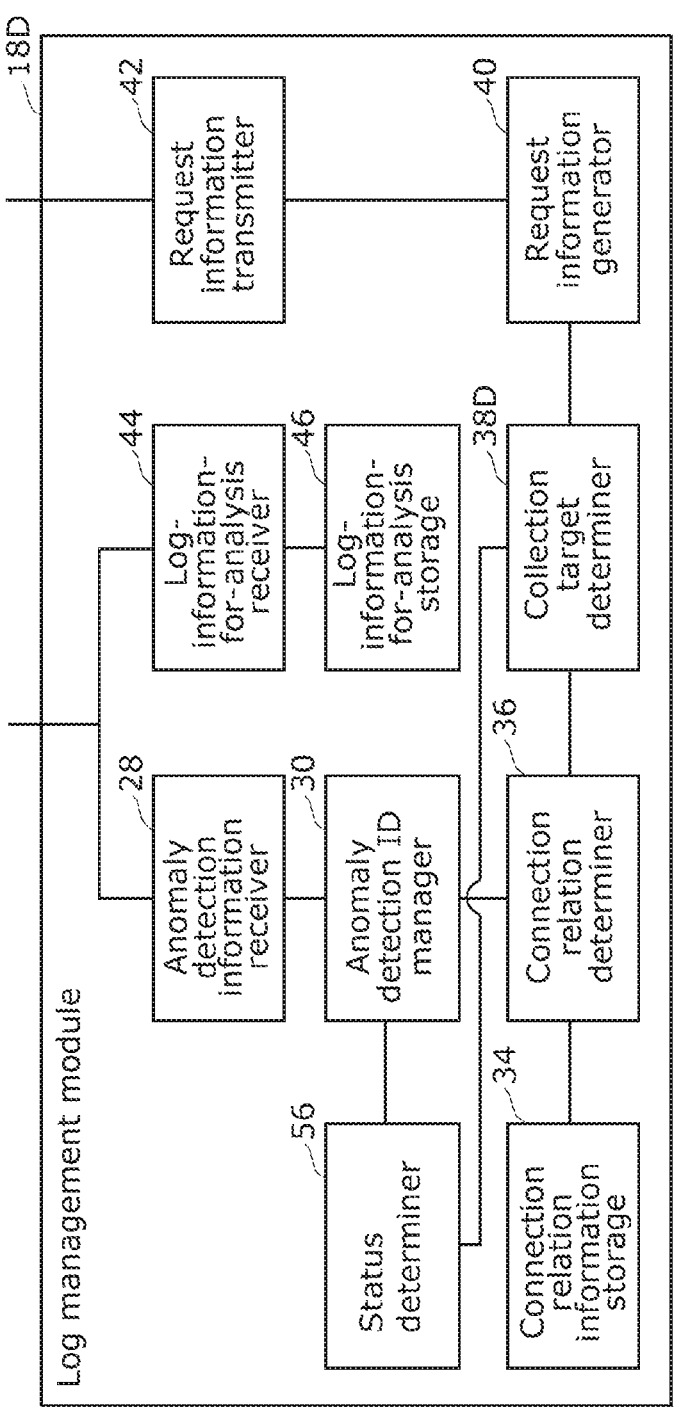
FIG. 15 is a block diagram illustrating a functional configuration of a log management module according to Embodiment 3.

Next, a functional configuration of log management module 18D according to Embodiment 3 will be described with reference to FIG. 15. FIG. 15 is a block diagram illustrating a functional configuration of log management module 18D according to Embodiment 3.

As illustrated in FIG. 15, log management module 18D according to Embodiment 3 includes status determiner 56 in addition to the structural components described in Embodiment 1 above. It should be noted that log management module 18D does not include detection history information storage 32 described in Embodiment 1 above.

Status determiner 56 determines the remaining storage capacity of log-information-for-analysis storage 46. Log-information-for-analysis storage 46 is one example of the log information storage that stores log information.

In addition, collection target determiner 38D determines, as collection targets whose log information for analysis is to be collected, one or more candidate devices, based on a result of the determination performed by status determiner 56.

3-2. Operation of Log Management Module

Figure 16:
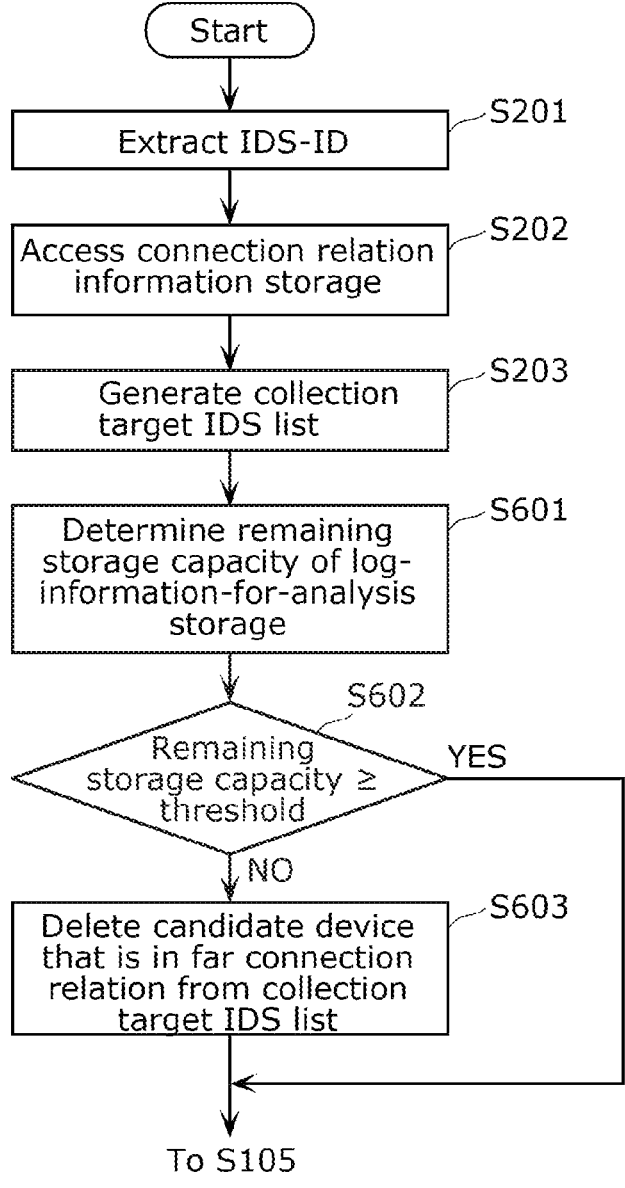
FIG. 16 is a flowchart illustrating the flow of the operation performed by the log management module according to Embodiment 3.
Figure 17:
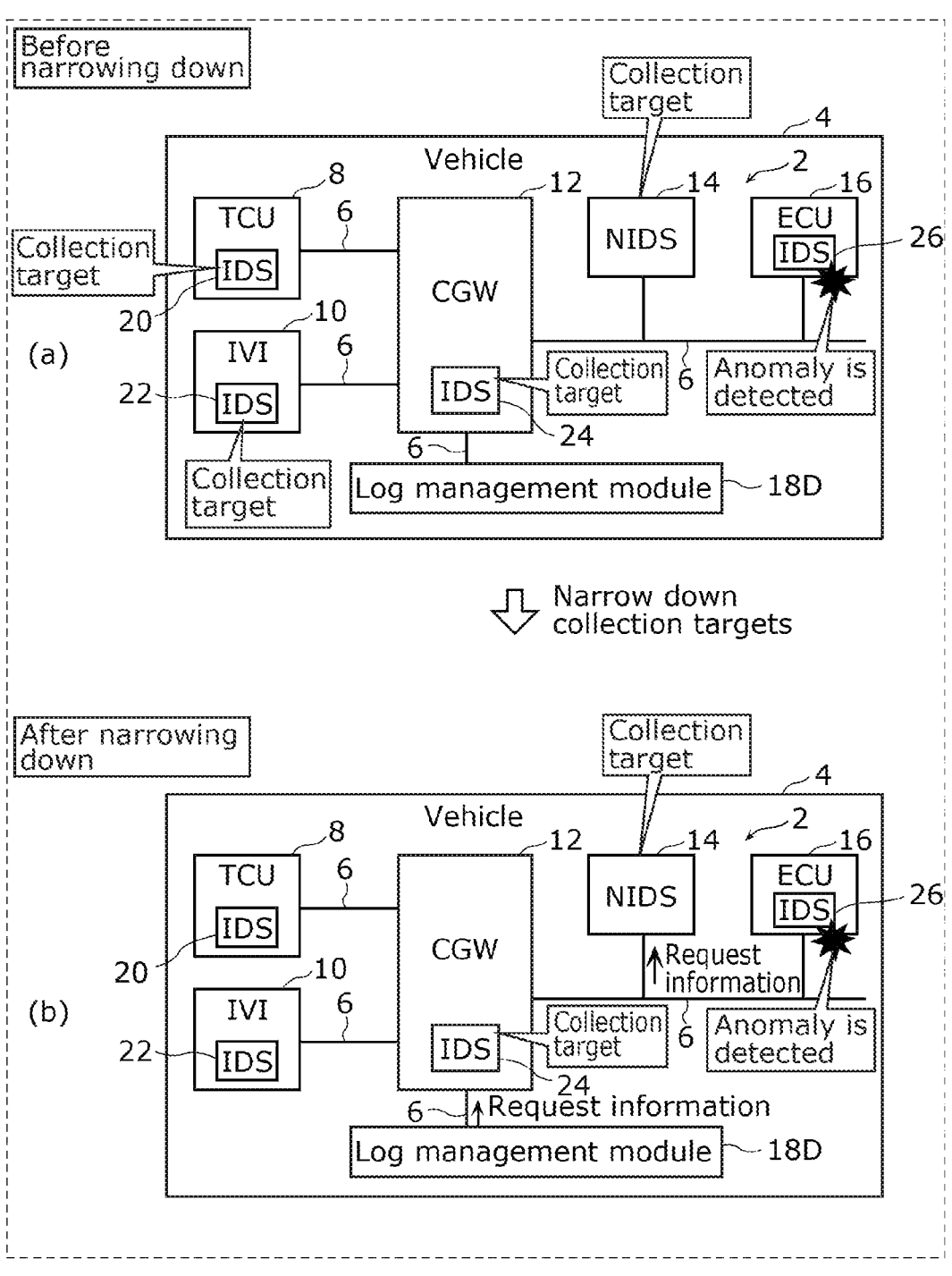
FIG. 17 is a diagram illustrating the operation performed by the log management module according to Embodiment 3.

The following describes an operation (processing of determining collection targets whose log information for analysis is to be collected) performed by log management module 18D according to Embodiment 3, with reference to FIG. 16 and FIG. 17. FIG. 16 is a flowchart illustrating the flow of the operation performed by log management module 18D according to Embodiment 3. FIG. 17 is a diagram illustrating the operation performed by log management module 18D according to Embodiment 3. It should be noted that, in the flowchart illustrated in FIG. 16, the same processes as those indicated in the flowchart of FIG. 4 are assigned with the same step numbers, and redundant descriptions will be omitted The following describes the case where an anomaly is detected in IDS 26 of ECU 16 and anomaly detection information receiver 28 receives anomaly detection information from IDS 26 of ECU 16, as illustrated in (a) of FIG. 17.

As illustrated in FIG. 16, steps S201 to S203 are performed in the same manner as Embodiment 1 described above. In the collection target IDS list generated in step S203, IDS 20 of TCU 8, IDS 22 of IVI 10, IDS 24 of CGW 12, and NIDS 14 are included as the collection targets whose log information for analysis is to be collected. In the example illustrated in (a) in FIG. 17, at this point, collection target determiner 38D tentatively determines IDS 20 of TCU 8, IDS 22 of IVI 10, IDS 24 of CGW 12, and NIDS 14 as the collection targets whose log information for analysis is to be collected.

Status determiner 56 determines the remaining storage capacity of log-information-for-analysis storage 46 (S601). Collection target determiner 38D determines whether the remaining storage capacity of log-information-for-analysis storage 46 is greater than or equal to a threshold, based on a result of the determination performed by status determiner 56. (S602).

When the remaining storage capacity of log-information-for-analysis storage 46 is less than the threshold (NO in S602), collection target determiner 38D narrows down the collection targets whose log information for analysis is to be collected, by deleting any candidate devices that are in a far connection relation with IDS 26 of ECU 16, from the collection target IDS list (S603). In the example illustrated in (b) in FIG. 17, collection target determiner 38D deletes, from the collection target IDS list, IDS 20 of TCU 8 and IDS 22 of IVI 10 each of which is in a far connection relation with IDS 26 of ECU 16 in which anomaly has been detected.

Returning to step S602, when the remaining storage capacity of log-information-for-analysis storage 46 is greater than or equal to the threshold (YES in S602), the process proceeds to step S105 of the flowchart in FIG. 3. In this case, although not illustrated in the diagram, collection target determiner 38D finally determines IDS 20 of TCU 8, IDS 22 of IVI 10, IDS 24 of CGW 12, and NIDS 14 as the collection targets whose log information for analysis is to be collected.

3-3. Advantageous Effects

According to the present embodiment, collection target determiner 38D determines, as collection targets whose log information for analysis is to be collected, one or more candidate devices, based on a result of the determination performed by status determiner 56. More specifically, when the remaining storage capacity of log-information-for-analysis storage 46 is sufficient, collection target determiner 38D does not narrow down the collection targets whose log information for analysis is to be collected. On the other hand, when the remaining storage capacity of log-information-for-analysis storage 46 is not sufficient, collection target determiner 38D narrows down the collection targets whose log information for analysis is to be collected.

In this manner, log information for analysis can be collected appropriately, and it is possible to inhibit the remaining storage capacity of log-information-for-analysis storage 46 from becoming insufficient.

It should be noted that status determiner 56 determines the remaining storage capacity of log-information-for-analysis storage 46 according to the present embodiment, but the present disclosure is not limited to this. For example, status determiner 56 may determine the communication capacity in the in-vehicle network, the movement status of vehicle 4, or the functional operation status of vehicle 4.

When status determiner 56 determines the communication capacity in the in-vehicle network, collection target determiner 38D determines one or more candidate devices as collection targets whose log information for analysis is to be collected, based on a result of the determination performed by status determiner 56, in the following manner. When the communication capacity in the in-vehicle network is sufficient, collection target determiner 38D does not narrow down the collection targets whose log information for analysis is to be collected. On the other hand, when the communication capacity in the in-vehicle network is not sufficient, collection target determiner 38D narrows down the collection targets whose log information for analysis is to be collected.

In addition, when status determiner 56 determines the movement status of vehicle 4, collection target determiner 38D determines one or more candidate devices as collection targets whose log information for analysis is to be collected, based on a result of the determination performed by status determiner 56, in the following manner. When vehicle 4 is stopped, collection target determiner 38D does not narrow down the collection targets whose log information for analysis is to be collected. On the other hand, when vehicle 4 is in motion, collection target determiner 38D narrows down the collection targets whose log information for analysis is to be collected. This is because it is estimated that the communication capacity in the in-vehicle network is not sufficient when vehicle 4 is in motion, and that the communication capacity in the in-vehicle network is sufficient when vehicle 4 is stopped.

In addition, when status determiner 56 determines the functional operation status of vehicle 4, collection target determiner 38D determines one or more candidate devices as collection targets whose log information for analysis is to be collected, based on a result of the determination performed by status determiner 56, in the following manner. When vehicle 4 is driving automatically, collection target determination unit 38D does not narrow down the collection targets whose log information for analysis is to be collected. On the other hand, when vehicle 4 is being driven manually, collection target determiner 38D narrows down the collection targets whose log information for analysis is to be collected. This is because it is estimated that the risk of an attack is high when vehicle 4 is driving automatically, and that the risk of an attack is low when vehicle 4 is being driven manually. Alternatively, collection target determiner 38D may skip the narrowing down of the collection targets whose log information for analysis is to be collected when vehicle 4 is being driven manually, and collection target determiner 38D may narrow down the collection targets whose log information for analysis is to be collected when vehicle 4 is driving automatically. This is because it is estimated that the communication capacity in the in-vehicle network is not sufficient when vehicle 4 is driving automatically, and that the communication capacity in the in-vehicle network is sufficient when vehicle 4 is being driven manually.

It should be noted that the determination of the functional operating status of vehicle 4 is not limited to the determination of whether vehicle 4 is driving automatically or being driven manually, but may also be determined using the communication status of vehicle 4 or the operating status of the control function that affect the risk of attack.

Embodiment 4

4-1. Functional Configuration of Log Management Module

Figure 18:
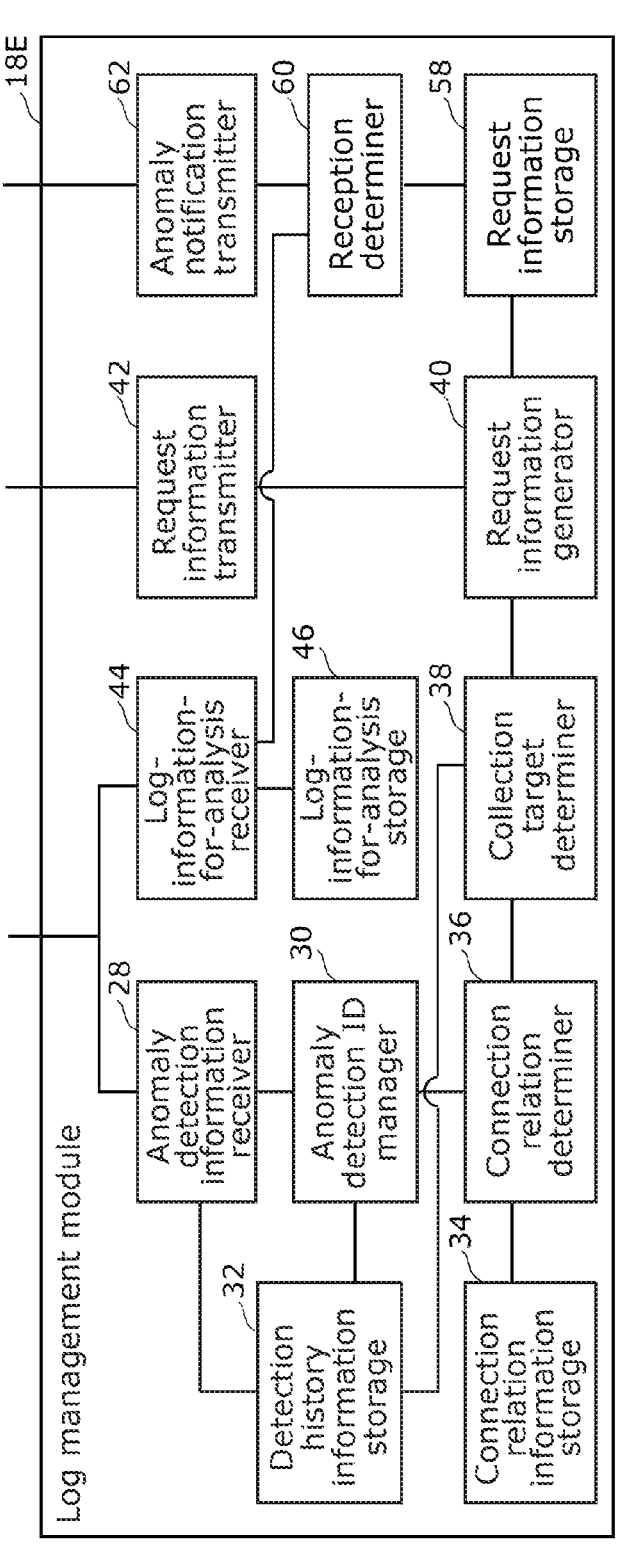
FIG. 18 is a block diagram illustrating a functional configuration of a log management module according to Embodiment 4.

Next, a functional configuration of log management module 18E according to Embodiment 4 will be described with reference to FIG. 18. FIG. 18 is a block diagram illustrating a functional configuration of log management module 18E according to Embodiment 4.

As illustrated in FIG. 18, log management module 18E according to Embodiment 4 includes request information storage 58, reception determiner 60, and anomaly notification transmitter 62 in addition to the structural components described in Embodiment 1 above.

Request information storage 58 stores the request information generated by request information generator 40.

Reception determiner 60 determines whether log information for analysis is received by log-information-for-analysis receiver 44 within a predetermined period of time after request information has been transmitted by request information transmitter 42.

Anomaly notification transmitter 62 transmits an anomaly notification to the outside of log management module 18E when reception determiner 60 determines that the log information for analysis has not been received within the predetermined period of time. It should be noted that the destination of the anomaly notification is, for example, a monitoring module (not illustrated) included in communication system 2, or a monitoring server (not illustrated) located outside vehicle 4.

4-2. Operation of Log Management Module

Figure 19:
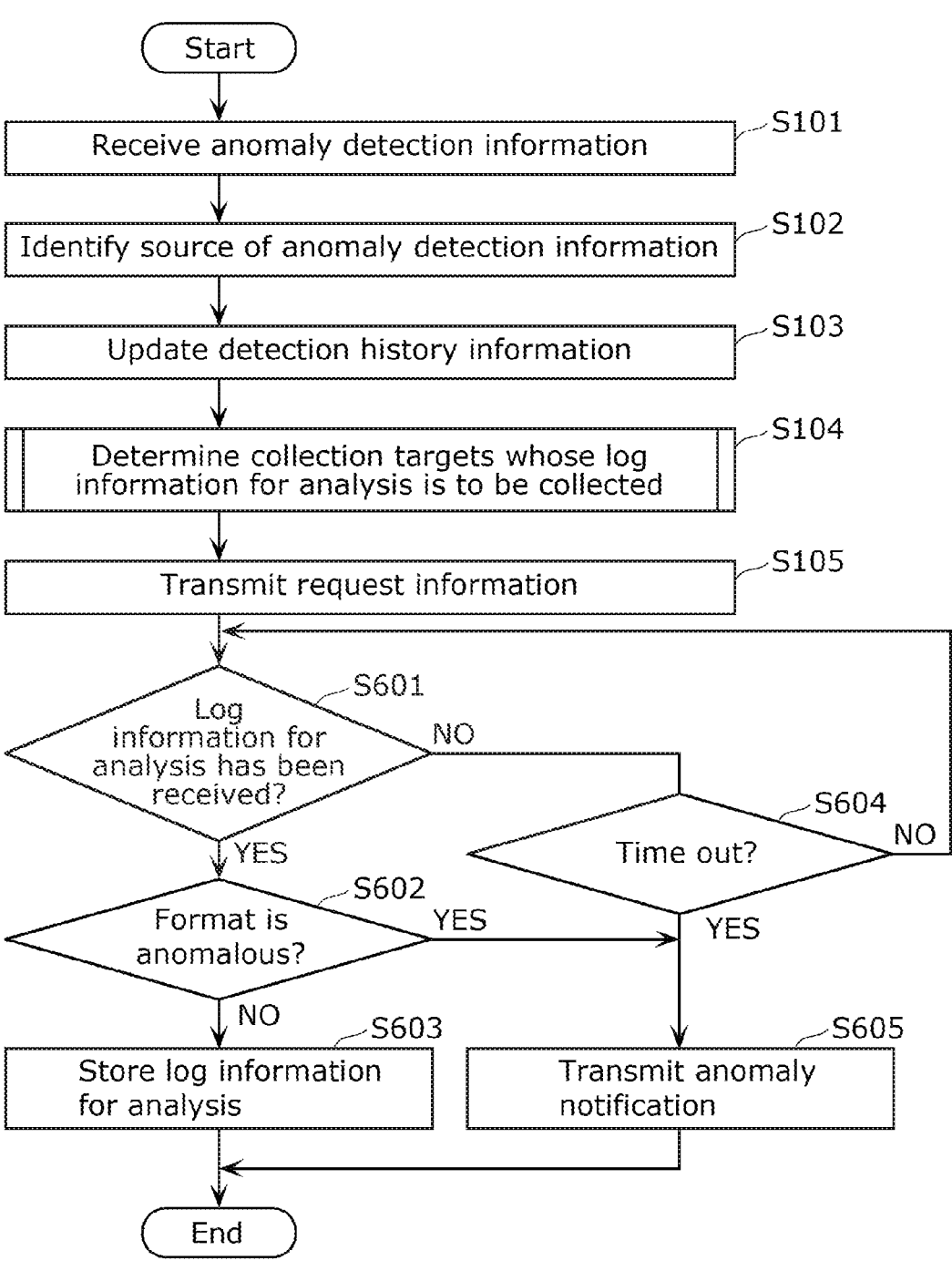
FIG. 19 is a flowchart illustrating the flow of the operation performed by the log management module according to Embodiment 4.

The following describes an operation performed by log management module 18E according to Embodiment 4, with reference to FIG. 19. FIG. 19 is a flowchart illustrating the flow of the operation performed by log management module 18E according to Embodiment 4. It should be noted that, in the flowchart illustrated in FIG. 19, the same processes as those indicated in the flowchart of FIG. 3 are assigned with the same step numbers, and redundant descriptions will be omitted As illustrated in FIG. 19, steps S101 to S105 are performed in the same manner as Embodiment 1 described above. Subsequent to step S105, reception determiner 60 determines whether the log information for analysis has been received by log-information-for-analysis receiver 44 (S601).

When the log information for analysis has been received by log-information-for-analysis receiver 44 (YES in S601), reception determiner 60 determines whether the format of the log information for analysis that has been received is anomalous (S602).

When the format of the log information for analysis that has been received is not anomalous (NO in S602), log-information-for-analysis receiver 44 stores the log information for analysis that has been received in log-information-for-analysis storage 46 according to the instruction from the reception determiner 60 (S603).

Returning to step S602, when the format of the log information for analysis that has been received is anomalous (YES in S602), reception determiner 60 instructs anomaly notification transmitter 62 to transmit an anomaly notification indicating that the format of the log information for analysis that has been received is anomalous. In this manner, anomaly notification transmitter 62 transmits an anomaly notification to the outside of log management module 18E (S605).

Returning to step S601, when the log information for analysis is not received by log-information-for-analysis receiver 44 within a predetermined period of time after request information transmitter 42 has transmitted the request information (NO in S601, YES in S604), reception determiner 60 instructs anomaly notification transmitter 62 to transmit an anomaly notification indicating that the log information for analysis has not been received. In this manner, anomaly notification transmitter 62 transmits an anomaly notification to the outside of log management module 18E (S605).

Returning to step S601, when the log information for analysis is received by log-information-for-analysis receiver 44 within a predetermined period of time after request information transmitter 42 has transmitted the request information (NO in S601, NO in S604), the process returns to step S601 described above.

4-3. Advantageous Effects

According to the present embodiment, anomaly notification transmitter 62 transmits an anomaly notification to the outside of log management module 18E when log information for analysis is not received by log-information-for-analysis receiver 44 within a predetermined period of time after request information has been transmitted by request information transmitter 42.

When the log information for analysis cannot be received, it is not possible to analyze the presence or absence of an undetected anomaly in the in-vehicle network. Therefore, the failure to receive log information for analysis itself is considered an anomalous event, and by transmitting an anomaly notification to the outside, it is possible to promptly take appropriate measures for such an anomalous event.

Other Variations

Although an information processing device and a method of controlling the information processing device according to one or more aspects have been described based on the above-described embodiments, the present disclosure is not limited to the above-described embodiments. Other forms in which various modifications apparent to those skilled in the art are applied to the embodiments, or forms structured by combining structural components of different embodiments may be included within the scope of the one or more aspects, unless such changes and modifications depart from the scope of the present disclosure.

In each of the above-described embodiments, log management module 18 (18A to 18E) according to the present disclosure has been described as a device connected to CGW 12 in the in-vehicle network included in vehicle 4 such as an automobile, but the location of log management module 18 (18A to 18E) is not limited to the above as long as log management module 18 (18A to 18E) is connected to the in-vehicle network, and may be included in a monitoring center connected to vehicle 4, for example.

In addition, in each of the above-described embodiments, the log management module has been described as a stand-alone device as an example of application of log management module 18 (18A to 18E) according to the present disclosure, but the present disclosure is not limited to this. The log management module may be not a stand-alone device, and may be built into other devices such as CGW 12, for example.

In addition, in each of the above-described embodiments, the application to security measures in the in-vehicle network included in vehicle 4 such as an automobile has been described as an example of application of log management module 18 (18A to 18E) according to the present disclosure, but the range of application of log management modules 18 (18A to 18E) according to the present disclosure is not limited to this. Log management module 18 (18A to 18E) according to the present disclosure is not limited to vehicle 4 such as an automobile, but may be applied to any mobility such as construction equipment, agricultural equipment, ships, trains, or airplanes, for example.

Each of the structural components in each of the above-described embodiments may be configured in the form of an exclusive hardware product, or may be realized by executing a software program suitable for each of the structural components. Each of the structural components may be realized by means of a program executing unit, such as a CPU and a processor, reading and executing the software program recorded on a recording medium such as a hard disk or a semiconductor memory.

In addition, some or all of the functions of the information processing device according to the above-described embodiments may be implemented by a processor, such as a CPU, executing a program.

A part or all of the structural components constituting the respective devices may be configured as an IC card which can be attached and detached from the respective devices or as a stand-alone module. The IC card or the module is a computer system configured from a microprocessor, a ROM, a RAM, and so on. The IC card or the module may also include the aforementioned super-multi-function LSI. The IC card or the module achieves its function through the microprocessor's operation according to the computer program. The IC card or the module may also be implemented to be tamper-resistant.

The present disclosure may also be realized as the methods described above. In addition, these methods may be implemented as a computer program, using a computer, and may also be a digital signal including the computer program. Furthermore, the present disclosure may also be realized by storing the computer program or the digital signal in a non-transitory computer readable recording medium such as flexible disc, a hard disk, a CD-ROM, an MO, a DVD, a DVD-ROM, a DVD-RAM, a BD (Blu-ray (registered trademark) Disc), and a semiconductor memory. Furthermore, the present disclosure may also include the digital signal recorded in these recording media. In addition, the present disclosure may also be realized by the transmission of the aforementioned computer program or digital signal via a telecommunication line, a wireless or wired communication line, a network represented by the Internet, a data broadcast and so on Furthermore, the present disclosure may also be a computer system including a microprocessor and a memory, in which the memory stores the aforementioned computer program and the microprocessor operates according to the computer program. In addition, by transferring the program or the digital signal by recording onto the aforementioned recording media, or by transferring the program or digital signal via the aforementioned network and the like, execution using another independent computer system is also made possible.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2020-181935 filed on Oct. 29, 2020, and PCT International Application No. PCT/JP2021/037477 filed on Oct. 8, 2021.

INDUSTRIAL APPLICABILITY

The information processing device according to the present disclosure is applicable to an automatic driving system, etc. included in a vehicle, for example.

The invention claimed is:

1. An information processing device connected to a mobility network included in a mobility, the information processing device comprising:

a processor; and a memory including a program that, when executed by the processor, causes the processor to perform functions, the functions including:

receiving anomaly detection information from a specific device among a plurality of devices connected to the mobility network, the anomaly detection information indicating that an anomaly has been detected in the specific device;

storing detection history information indicating a history of anomaly detection in each of the plurality of devices;

storing attack route information indicating a candidate for an attack route in the mobility network;

estimating the attack route including the specific device, based on the attack route information;

determining, upon receipt of the anomaly detection information, as collection targets whose log information for analysis is to be collected, one or more candidate devices narrowed down from the plurality of devices based on the detection history information, the log information for analysis being for analyzing for a presence or an absence of an undetected anomaly in the mobility network, the one or more candidate devices being present on the attack route estimated by the processor and having no history of anomaly detection;

transmitting request information to the one or more candidate devices, the request information being for requesting transmission of the log information for analysis; and receiving the log information for analysis transmitted from the one or more candidate devices in response to the request information, wherein the collection targets whose log information for analysis is to be collected are narrowed down by deleting a candidate device that is not included in the attack route estimated by the processor from the collection targets.

2. An information processing device connected to a mobility network included in a mobility, the information processing device comprising:

a processor; and a memory including a program that, when executed by the processor, causes the processor to perform functions, the functions including:

receiving anomaly detection information from a specific device among a plurality of devices connected to the mobility network, the anomaly detection information indicating that an anomaly has been detected in the specific device;

storing connection relation information indicating interconnection relations between the plurality of devices;

storing detection history information indicating a history of anomaly detection in each of the plurality of devices;

determining, upon receipt of the anomaly detection information, as collection targets whose log information for analysis is to be collected, one or more candidate devices narrowed down from the plurality of devices based on the connection relation information and the detection history information, the log information for analysis being for analyzing for a presence or an absence of an undetected anomaly in the mobility network, the one or more candidate devices being in a predetermined connection relation with the specific device and having no history of anomaly detection;

transmitting request information to the one or more candidate devices, the request information being for requesting transmission of the log information for analysis; and receiving the log information for analysis transmitted from the one or more candidate devices in response to the request information, wherein the collection targets whose log information for analysis is to be collected are narrowed down by deleting a candidate device having a history of anomaly detection from the collection targets.

3. An information processing device connected to a mobility network included in a mobility, the information processing device comprising:

a processor; and a memory including a program that, when executed by the processor, causes the processor to perform functions, the functions including:

receiving anomaly detection information from a specific device among a plurality of devices connected to the mobility network, the anomaly detection information indicating that an anomaly has been detected in the specific device;

storing connection relation information indicating interconnection relations between the plurality of devices;

determining, at least for collection targets determined from the plurality of devices, a distance from the specific device;

storing, in a storage, log information;

determining a status of at least one of: a remaining storage capacity of the storage; a communication capacity in the mobility network; a movement status of the mobility; or a functional operation status of the mobility, at least including determining the movement status of the mobility;

determining, upon receipt of the anomaly detection information, based on a determination result of the status: whether to narrow down the collection targets whose log information for analysis is to be collected;

and a target number of collection targets to be narrowed down to, and when the collection targets are to be narrowed, determining the collection targets by not designating, as the collection targets, devices among the plurality of devices in descending order of the distance from the specific device obtained from the connection relation information and a determination result of the distance, until a total number of remaining collection targets reaches the target number of collection targets;

restricting narrowing down of the collection targets when the movement status of the mobility is stopped, and narrowing down the collection targets when the movement status of the mobility is in motion;

transmitting request information to one or more candidate devices determined as the collection targets, the request information being for requesting transmission of the log information for analysis; and receiving the log information for analysis transmitted from the one or more candidate devices determined as the collection targets in response to the request information.

4. The information processing device according to claim 3, wherein the processor determines the remaining storage capacity of the storage, and the processor restricts the narrowing down of the collection targets when the remaining storage capacity of the storage is sufficient and the mobility is stopped, and narrows down the collection targets when the remaining storage capacity of the storage is not sufficient and the mobility is in motion.

5. The information processing device according to claim 3, wherein the processor determines the communication capacity in the mobility network, and the processor restricts the narrowing down of the collection targets when the communication capacity in the mobility network is sufficient and the mobility is stopped, and narrows down the collection targets when the communication capacity in the mobility network is not sufficient and the mobility is in motion.

6. The information processing device according to claim 3, wherein the processor determines the functional operation status of the mobility, and the processor restricts the narrowing down of the collection targets when the mobility is being driven automatically and the mobility is stopped, and narrows down the collection targets when the mobility is being driven manually and the mobility is in motion.

7. The information processing device according to claim 1, further comprising:

a storage that stores the log information for analysis transmitted from the one or more candidate devices in response to the request information, wherein the processor deletes the log information for analysis stored in the storage in ascending order of effectiveness related to a degree of effectiveness of the log information for analysis, based on association information indicating associations between the log information for analysis and the effectiveness.

8. The information processing device according to claim 7, wherein the effectiveness is determined based on a distance between the specific device and a source of the log information for analysis.

9. The information processing device according to claim 7, wherein the effectiveness is determined based on a position of a source of the log information for analysis relative to the specific device.

10. The information processing device according to claim 1, wherein the functions further include:

transmitting an anomaly notification when the log information for analysis is not received within a predetermined period of time after the request information has been transmitted.

11. A method of controlling an information processing device connected to a mobility network included in a mobility, the method comprising:

(a) receiving anomaly detection information from a specific device among a plurality of devices connected to the mobility network, the anomaly detection information indicating that an anomaly has been detected in the specific device;

(b) estimating an attack route including the specific device, based on attack route information indicating a candidate for the attack route in the mobility network;

(c) upon receipt of the anomaly detection information in (a), determining, as collection targets whose log information for analysis is to be collected, one or more candidate devices narrowed down from the plurality of devices based on detection history information, the log information for analysis being for analyzing for a presence or an absence of an undetected anomaly in the mobility network, the one or more candidate devices being present on the attack route estimated in (b) and having no history of anomaly detection, the detection history information indicating a history of anomaly detection in each of the plurality of devices;

(d) transmitting request information to the one or more candidate devices determined in (c), the request information being for requesting transmission of the log information for analysis; and (e) receiving the log information for analysis transmitted from the one or more candidate devices in response to the request information, wherein the collection targets whose log information for analysis is to be collected are narrowed down by deleting a candidate device that is not included in the attack route, estimated in (b), from the collection targets.

12. A method of controlling an information processing device connected to a mobility network included in a mobility, the method comprising:

(a) receiving anomaly detection information from a specific device among a plurality of devices connected to the mobility network, the anomaly detection information indicating that an anomaly has been detected in the specific device;

(b) upon receipt of the anomaly detection information in (a), determining, as collection targets whose log information for analysis is to be collected, one or more candidate devices narrowed down from the plurality of devices based on connection relation information and detection history information, the log information for analysis being for analyzing for a presence or an absence of an undetected anomaly in the mobility network, the one or more candidate devices being in a predetermined connection relation with the specific device and having no history of anomaly detection, the connection relation information indicating interconnection relations between the plurality of devices, the detection history information indicating a history of anomaly detection in each of the plurality of devices;

(c) narrowing down the collection targets whose log information for analysis is to be collected by deleting a candidate device having a history of anomaly detection from the collection targets;

(d) transmitting request information to the one or more candidate devices determined as the collection targets in (b) and narrowed down in (c), the request information being for requesting transmission of the log information for analysis; and (e) receiving the log information for analysis transmitted from the one or more candidate devices determined as the collection targets in response to the request information.

13. A method of controlling an information processing device connected to a mobility network included in a mobility, the method comprising:

(a) receiving anomaly detection information from a specific device among a plurality of devices connected to the mobility network, the anomaly detection information indicating that an anomaly has been detected in the specific device;

(b) determining, at least for collection targets determined from the plurality of devices, a distance from the specific device;

(c) determining at least one of: a remaining storage capacity of a storage that stores log information; a communication capacity in the mobility network; a movement status of the mobility; or a functional operation status of the mobility, at least including determining the movement status of the mobility;

(d) upon receipt of the anomaly detection information in (a), determining based on a result of the determining in (c): whether to narrow down the collection targets whose log information for analysis is to be collected; and a target number of collection targets to be narrowed down to, and when the collection targets are to be narrowed, determining the collection targets by not designating, as the collection targets, devices among the plurality of devices in descending order of the distance from the specific device obtained from connection relation information indicating interconnection relations between the plurality of devices and a result of the determining in (b), until a total number of remaining collection targets reaches the target number of collection targets;

(e) restricting narrowing down of the collection targets in (d) when the movement status of the mobility is stopped, and narrowing down the collection targets in (d) when the movement status of the mobility is in motion;

(f) transmitting request information to one or more candidate devices determined as the collection targets in (d) and narrowed down in (e), the request information being for requesting transmission of the log information for analysis; and (g) receiving the log information for analysis transmitted from the one or more candidate devices determined as the collection targets in response to the request information.

* * * * *